(12) United States Patent
Terrien et al.

(10) Patent No.: US 6,315,131 B1
(45) Date of Patent: Nov. 13, 2001

(54) MULTI-DIRECTIONAL FLOW GRAVITY SEPARATOR

(75) Inventors: Richard Terrien, Madison, WI (US); David Walker, Streator, IL (US)

(73) Assignee: Universal Separators, Inc., Madison, WI (US)

( * ) Notice: Subject to any disclaimer, the term of this patent is extended or adjusted under 35 U.S.C. 154(b) by 0 days.

(21) Appl. No.: 09/531,623

(22) Filed: Mar. 21, 2000

Related U.S. Application Data

(60) Provisional application No. 60/125,649, filed on Mar. 22, 1999.

(51) Int. Cl.$^7$ ................................................. C02F 1/40
(52) U.S. Cl. ........................ 210/519; 210/521; 210/540; 210/DIG. 5
(58) Field of Search .................................. 210/800, 801, 210/802, 519, 521, 522, 532.1, 538, 540, DIG. 5

(56) References Cited

U.S. PATENT DOCUMENTS

| | | |
|---|---|---|
| 654,965 | 7/1900 | Franke . |
| 886,696 | 5/1908 | Haller . |
| 1,343,764 * | 6/1920 | Clifford ................................. 210/519 |
| 1,624,092 * | 4/1927 | Coleman .............................. 210/519 |
| 1,748,541 * | 2/1930 | Davitt et al. ......................... 210/540 |
| 2,846,073 * | 8/1958 | Hopper, Sr. ........................... 210/540 |
| 3,638,796 | 2/1972 | Tuggle et al. . |
| 3,722,687 | 3/1973 | Stebbins et al. . |
| 3,756,409 | 9/1973 | Carmichael et al. . |
| 3,794,583 * | 2/1974 | Rhodes ........................... 210/DIG. 5 |
| 4,198,300 | 4/1980 | Williams . |
| 4,287,063 | 9/1981 | Stenzel . |
| 4,376,676 | 3/1983 | Gill . |
| 4,390,421 | 6/1983 | Hammershcmitt . |
| 4,414,112 | 11/1983 | Simpson et al. . |
| 4,610,788 | 9/1986 | Ward . |
| 4,802,978 | 2/1989 | Schmidt et al. . |
| 5,039,425 | 8/1991 | Caris et al. ........................... 210/691 |
| 5,073,266 | 12/1991 | Ball, IV ............................... 210/519 |
| 5,160,638 | 11/1992 | Petkovic . |
| 5,186,821 * | 2/1993 | Murphy ............................... 210/540 |
| 5,622,621 | 4/1997 | Kramer . |

OTHER PUBLICATIONS

Thomas, BL, 1968, How to size offshore waste water separators,*World Oil* Aug. 1, 1968: 66–69.

* cited by examiner

*Primary Examiner*—Christopher Upton
(74) *Attorney, Agent, or Firm*—Medlen & Carroll, LLP

(57) ABSTRACT

A multi-directional flow gravity separator for separating a mixture of two immiscible fluids with different densities includes an elongated generally vertical tank, in which the mixture flows in a generally downward direction, and an effluent discharge tube through which the clarified effluent flows upward and out the tank. Alternatively, the separator includes an elongated vessel, or shroud, within the tank, through which the mixture flows in a generally upward direction before flowing downwardly in the tank; the clarified effluent is discharged from about the bottom of the tank. Alternatively, a separator includes both the elongated vessel and an effluent discharge tube. Alternatively, the vessel of a separator includes a coalescer; preferably, the coalescer results in an increased length of the fluid flow path through the vessel; most preferably, the coalescer is a helical spiraled vane, which results in a helical fluid flow path. In all embodiments, the lighter fluid is collected and discharged from the upper portion of the separator. In another aspect, a bi-directional flow coalescing device includes an elongated vessel and a coalescer, where the mixture is introduced near the bottom of the vessel and flows generally in an upward direction through the coalescer; most preferably, the coalescer is a helical spiraled vane, which results in a helical fluid flow path.

3 Claims, 7 Drawing Sheets

MULTI-DIRECTIONAL FLOW GRAVITY SEPARATOR

This application claims the benefit of U.S. Provisional Application Serial No. 60/125,649. field Mar. 22, 1999.

FIELD OF THE INVENTION

The invention is directed to the separation of a mixture of two immiscible fluids of different specific gravities. In one aspect, it is directed to an apparatus for separating the two fluids by gravity and a multi-directional flow pattern. In another aspect, it is directed to a method for separating the two fluids by gravity and a multi-directional flow pattern.

BACKGROUND OF THE INVENTION

Due to problems of environmental pollution, there is increased interest in the separation of oil from mixtures of oil and water. Such separations may be necessary in large bodies of water, as in the case of oil slicks on oceans and lakes caused by leakage from tankers, drilling rigs, and storage tanks, which cause serious pollution of both open water and to the shore, and consequently injury to aquatic and terrestrial fauna and flora. Similarly, oil-water mixtures resulting from industrial activities has produced serious pollution problems when discharged into rivers, streams and other bodies of water. For plants with central wastewater treatment systems, the discharge of large volumes of oily waste water is an expensive and difficult treatment burden.

For example, many machine parts or heat treated parts are washed in parts washing tanks, and the washing solution is contaminated with manufacturing oils and heat treating quench oil. In the past, this contaminated wash water has been discharged into the sewage system, but due to the resulting pollution of the water system with oil, this practice has been discontinued; as a result, it became necessary to haul the oil-contaminated wash water away to disposal sites or for further separation treatment.

Other factors engendering increased interest in the separation of mixtures of oil and water include economic considerations, and work place safety and health. Oily contamination in the parts washing solutions contributes to an inefficient cleaning process which typically requires secondary cleaning and manufacturing steps to correct. These subsequent steps present added expense and time requirements to the manufacturing process. Environmentally, the contaminating oil in parts washers is often carried into subsequent heat treating tempering furnaces where the oil burns off as smoke in the plant and smoke discharged from the plant's smokestacks to the local environment. The health and safety of the workers is also damaged by the presence of this oily contaminant. Not only is the in-plant smoke a danger, but frequent changes of washing baths due to oil contamination require increased worker exposures to cleaning fluids and related handling hazards.

Several types of treatment methods and systems have been developed in efforts to efficiently separate oil from water-oil mixtures. One treatment method is filtration, by which oil is entrapped by a filter. Filtration may be accomplished by barrier filters, which include bag and cartridge filters, or by membrane filters, which filter fluids down to minute dimensions and are typically designed to remove emulsified oil from water. However, filters tend to clog quickly, and are time consuming and expensive to replace.

Another treatment method depends upon the use of gravity to separate a mixture of oil and water. Gravity separation exploits the difference in specific gravity between oil and water. A gravity separator typically consists of a large holding tank, in which oil rises to the surface of the water. These tanks must be substantially turbulent free to operate, and require an additional means with which to remove the oil. Thus, the tanks are filled, the oil collects at the surface and is removed, and the water returned for reuse or discharged. These tanks are slow, and require very large surface areas. Improved gravity separation involves horizontal separators. In these separators, water enters at one side of a horizontal tank, and as it flows to the other side, the oil rises to the surface, where it can be collected. The cleaner water is then discharged from another side of the tank. The oil is typically collected by means of a baffle, which holds the oil-water interface below the top of the baffle; the floating oil which accumulates above the interface then spills over the top and into a separate compartment from which it can be collected and discharged.

The use of coalescers in horizontal separators is well known. Coalescers are generally tightly packed beds of coalescing media or closely spaced plates, which aid in the separation of oil from water. Typical coalescer configurations are stacks of closely spaced plates, angled from vertical to horizontal. The plates may also be grooved or channeled, or wavy. Under the influence of gravity, oil separates from an oil/water mixture at a rate determined by Stokes law. This formula predicts how fast an object will rise or fall through a heavier fluid based on the density and size of the object and the distance it must travel. In a packed media bed coalescer, oil is exposed to large amounts of surface area provided by the coalescing media. As the oil-water mixture passes through this media, oil droplets are temporarily held by the coalescing media where they are exposed to further contact with oil molecules in the mixture. This physical contact on the surface of the coalescer media has the effect of increasing or coalescing the size of the oil droplets in the mixture. In closely spaced plate and corrugated coalescing separators oil rises only a short distance where it is captured on the underside of the coalescing plates. While the use of coalescers improves the performance of horizontal separators, the coalescers are very susceptible to clogging. In operation, these coalescing horizontal separators have the same type of failure as do filters, in that the coalescers can quickly clog and become blocked, thus requiring frequent and expensive maintenance. In addition, these coalescing separators still require a large footprint.

Another type of gravity separation is achieved by vertical separators. These separators generally involve discharge of an oil-water mixture into a vertical tube, which is generally open at the bottom and which sits in and thus empties into a water environment. This environment may be an open body of water, such as a lake or ocean, or it may be a collecting tank. The mixture is discharged near either the upper end or the lower end of the tube. As the mixture flows into the tube, the oil rises and the water sinks, effecting separation of the two different fluids. The cleaner water is discharged from the bottom of the tube into the surrounding water, whereas the oil collects at the top of the tube. The oil may be collected be means of a tube and a pump, or it may be discharged by means of an overflow tube.

A common use of such vertical separators is in off shore waste water separators. One type is a submerged caisson, which is a large diameter pipe projected vertically downward into the water and open at the bottom. A small diameter pipe is inserted vertically downward inside the large caisson to about two-thirds of its length. Oily waste water drains into the smaller interior pipe and flows downward and out into the large caisson, whereupon the flow of the water proceeds at a much lower rate, due to the larger diameter of the caisson. This allows oil droplets to separate and rise up to the surface, and the clarified water to flow down to and out the open bottom. The collected oil is allowed to accumulate until the oil-water interface is just above the inlet pipe, at which point the inflow of water is halted, and the oil pumped out. A major problem with this type of vertical separator is that the discharged, or effluent, water, still contains a considerable amount of residual oil; typically, the oil content of the water effluent is about 20% of the total initial amount of oil in the waste water.

Coalescers have also been used with vertical separators. One of the simplest is the use of gas bubbles in a pile skimmer, which is similar to the submerged caisson described above. In this system, the oily water mixture is introduced near the middle of the pipe, and gas is injected near the bottom of the pipe. The gas or dispersed gas bubbles contact and attach themselves to the oil droplets in the water, thus enhancing the gravitational separation by flotation. In another and more complex separator, a vertical tank contains a plurality of inclined corrugated plates. An oil-water mixture is introduced near the bottom of the tank, and then flows upward under pressure through the corrugated plates, which improve coalescence of the oil. The oil is directed upward by an oil channel, and the clarified water is then downward to a clean water outlet.

While these vertical separators represent improvements, they also possess distinct disadvantages. For example, open bottom cassions or skim piles do not manipulate the flow of the mixture to be separated in any way to effect physical separation between the oil and water, except by slowing down the inlet feed as it enters the separator. Due to this coarse separation mode, cassion type separators require large diameters (footprint) and large internal fluid volumes to create the separation conditions required. Thus, they are most suitable for open bodies of water; moreover, the recovered oil is not very dry, and a high percentage of the initial oil remains as residual oil in the clarified discharged water. The addition of counterflow compressed gasses requires the expense and maintenance of expensive air compressors and related equipment. These open bottom cassions or skim piles also require a substantially closed upper end to effect oil capture, which has the effect of making maintenance more difficult and making operational adjustments more difficult to visualize and calibrate accurately.

It would be very useful to provide a vertical oil-water separator which has no moving parts and which is open to the atmosphere, which is low maintenance and easy to operate, which can be operated in-line as in an industrial setting, and which has a very small footprint and is easy to install.

SUMMARY OF THE INVENTION

Thus, it is an object of the present invention to provide an apparatus for separating two immiscible fluids of differing specific gravities from a mixture of the two, where the apparatus has a small footprint, is comprised of a simple device with no moving parts, and comprises open, non clogging fluid separation passageways.

It is also an object of the present invention to provide a method for separating two immiscible fluids of differing specific gravities from a mixture of the two, where the method utilizes change if fluid flow direction and rate to effect the separation.

Surprisingly, separators of the present invention also result in the separation and collection of very high purity of both of the separated fluids. This results from the ability of the separator operators to readily check and calibrate the operation of the separator from its substantially open upper end, making it easier for operators to manipulate and control the captured fluid of lower density so as to produce a "dry" product substantially free of the fluid of higher density, so that the captured fluid may be resold or recycled.

Another unexpected advantage of the separators of the present invention is that they are also "self-correcting," in that they are able to handle incoming mixtures of varying proportions of two different fluids, and able to handle varying flow rate of the mixture within the separator, yet still discharge the final products of each individual fluid of consistently high purity.

Thus, the invention provides a multi-directional flow gravity separator for separating a mixture of two immiscible fluids having different densities including a heavier fluid and a lighter fluid, comprising a vertical elongated tank with a first cross-sectional inner area, an upper portion, a lower portion, and an open top end, means for introducing the mixture into the tank in the upper portion such that the mixture flows downward in the tank, a vertical effluent discharge tube for discharging the heavier fluid from the lower portion of the tank, wherein the tube has a second cross-sectional inner area which is less than the first cross-sectional inner area of the tank, a lower end in fluid communication with the lower portion of the tank and an upper end in fluid communication with means for discharging the heavier fluid from the upper end of the effluent discharge tube to outside the tank, and means for discharging the lighter fluid from the upper portion of the tank. In one embodiment, the effluent discharge tube is set within the tank and further wherein the lower end is an open lower end within the lower portion of the tank. In another embodiment, the means for discharging the heavier fluid from the upper end of the fluid effluent discharge tube is a first outlet in the upper portion of the tank, and the means for discharging the lighter fluid from the upper portion of the tank comprises a second outlet in the upper portion of the tank.

The invention also provides a multi-directional flow gravity separator for separating a mixture of two immiscible fluids having different densities including a heavier fluid and a lighter fluid, comprising a vertical elongated tank with a first cross-sectional area, an upper portion, a lower portion, and an open top end, and an elongated shroud in fluid communication with the tank, wherein the shroud has a second cross-sectional inner area which is less than the first cross-sectional inner area of the tank, and an open top end and a closed bottom end, wherein the open top end is in fluid communication with the tank, an inlet pipe for introducing the mixture into the shroud, wherein the pipe has a third cross-sectional inner area which is less than the second cross-sectional inner area of the shroud and an open first end outside the tank and a second end in fluid communication with the closed bottom end of the shroud, means for discharging the heavier fluid from the lower portion of the tank, and means for discharging the lighter fluid from the upper portion of the tank. In one embodiment, the shroud is a vertical shroud and set within the tank, such that the open top end of the shroud is below the open top end of the tank and within the upper portion of the tank, and further wherein the inlet pipe is a vertical pipe within the shroud, such that the open first end is an open upper end above the open top end of the tank and where the second end is an open lower end near the closed bottom end of the shroud, such that the open lower end of the inlet pipe is in fluid communication with the closed bottom end of the shroud. In another embodiment, the means for discharging the heavier fluid from the lower portion of the tank comprises a first outlet in the lower portion of the tank, and wherein the means for discharging the lighter fluid from the upper portion of the tank comprises a second outlet in the upper portion of the tank. In yet another embodiment, the shroud further comprises a coalescer within the shroud. In yet another embodiment, the shroud and the inlet pipe are cylindrical and the shroud comprises a coalescer within the shroud, wherein the coalescer comprises a continuously spiraled vane extending from about the open lower end of the inlet pipe to about the open top end of the shroud and having an inner edge and an outer edge, wherein the inner edge of the vane is in close contact with an exterior surface of the inlet pipe, and the outer edge of the vane is in close contact with an inner surface of the shroud, such that the mixture cannot substantially pass between the outer edge of the vane and the inner surface of the shroud or between the inner edge of the vane and the exterior surface of the inlet pipe, thereby forming a helical fluid path within the shroud.

The invention also provides a multi-directional flow gravity separator for separating a mixture of two immiscible fluids having different densities including a heavier fluid and a lighter fluid, comprising a vertical elongated tank with a first cross-sectional area, an upper portion, a lower portion, and an open top end, and an elongated shroud in fluid communication with the tank, wherein the shroud has a second cross-sectional inner area which is less than the first cross-sectional inner area of the tank, and an open top end and a closed bottom end, wherein the open top end is in fluid communication with the tank, an inlet pipe for introducing the mixture into the shroud, wherein the pipe has a third cross-sectional inner area which is less than the second cross-sectional inner area of the shroud and an open first end outside the tank and a second end in fluid communication with the closed bottom end of the shroud, means for discharging the heavier fluid from the lower portion of the tank, and means for discharging the lighter fluid from the upper portion of the tank. wherein the means for discharging the heavier fluid comprises a vertical effluent discharge tube for discharging the heavier fluid from the lower portion of the tank, wherein the effluent discharge tube has a third cross-sectional inner area which is less than the first cross-sectional inner area of the tank, a lower end in fluid communication with the lower portion of the tank, and an upper end in fluid communication with means for discharging the heavier fluid from the upper end of the effluent discharge tube to outside the tank. In one embodiment, the means for discharging the lighter fluid from the upper portion of the tank comprises a first outlet in the upper portion of the tank, and wherein the means for discharging the heavier fluid from the upper end of the effluent discharge tube to outside the tank comprises a second outlet in the upper portion of the tank, such that the second outlet is slightly lower than the first outlet. In another embodiment, the effluent discharge tube is set within the tank and wherein the lower end is an open lower end within the lower portion of the tank, and further wherein the shroud is a vertical shroud and set within the tank, such that the open top end of the shroud is below the open top end of the tank and within the upper portion of the tank, and further wherein the inlet pipe is a vertical pipe within the shroud, such that the open first end is an open upper end above the open top end of the tank and where the second end is an open lower end near the closed bottom end of the shroud, such that the open lower end of the inlet pipe is in fluid communication with the closed bottom end of the shroud. In yet another embodiment, a separator further comprises a weir housing in fluid communication with the means for discharging the heavier fluid from the upper end of the effluent discharge tube to outside the tank, a weir within the weir housing and downstream of the means for discharging the heavier fluid from the upper end of the effluent discharge tube and outside the tank, and means within the weir housing and downstream of the weir for discharging the fluid from the weir housing. In yet another embodiment, the weir is an adjustable weir.

The invention also provides a separator as described previously, wherein the separator comprises a shroud and further comprises a coalescer within the shroud. In another embodiment, the shroud and the inlet pipe are cylindrical and further wherein the coalescer comprises a continuously spiraled vane extending from about the open lower end of the inlet pipe to about the open upper end of the shroud and having an inner edge and an outer edge, wherein the inner edge of the vane is in close contact with an exterior surface of the inlet pipe, and the outer edge of the vane is in close contact with an inner surface of the shroud, such that the mixture cannot substantially pass between the outer edge of the vane and the inner surface of the shroud or between the inner edge of the vane and the exterior surface of the inlet pipe, thereby forming a helical fluid path within the shroud.

The invention also provides a bi-directional flow coalescing device for separating a mixture of two immiscible fluids having different densities, comprising an elongated shroud with a first cross-sectional inner area and an open top end and a closed bottom end, an inlet pipe in fluid communication with the shroud, wherein the pipe has a second cross-sectional inner area which is less than the first cross-sectional inner area of the shroud and an open first end outside the shroud and a second end in fluid communication with the closed bottom end of the shroud, and a coalescer within the shroud. In another embodiment, the inlet pipe is a pipe within the shroud, with an open upper end above the open top end of the shroud and with an open lower end near the closed bottom end of the shroud, such that the open lower end of the inlet pipe is in fluid communication with the closed lower end of the shroud. In another embodiment, the shroud and the pipe are cylindrical and the coalescer further comprises a continuously spiraled vane extending from about the open lower end of the inlet pipe to about the open upper end of the shroud and having an inner edge and an outer edge, wherein the inner edge of the vane is in close contact with an exterior surface of the inlet pipe, and the outer edge of the vane is in close contact with an inner surface of the shroud, such that the mixture cannot substantially pass between the outer edge of the vane and the inner surface of the shroud or between the inner edge of the vane and the exterior surface of the inlet pipe, thereby forming a helical fluid path within the shroud.

The invention also provides a method for continuously separating a mixture of two immiscible fluids having different densities including a lighter fluid and a heavier fluid, where the method can be carried out by any of the embodiments described above, although it need not be limited to these embodiments.

DETAILED DESCRIPTION

Figure 1:
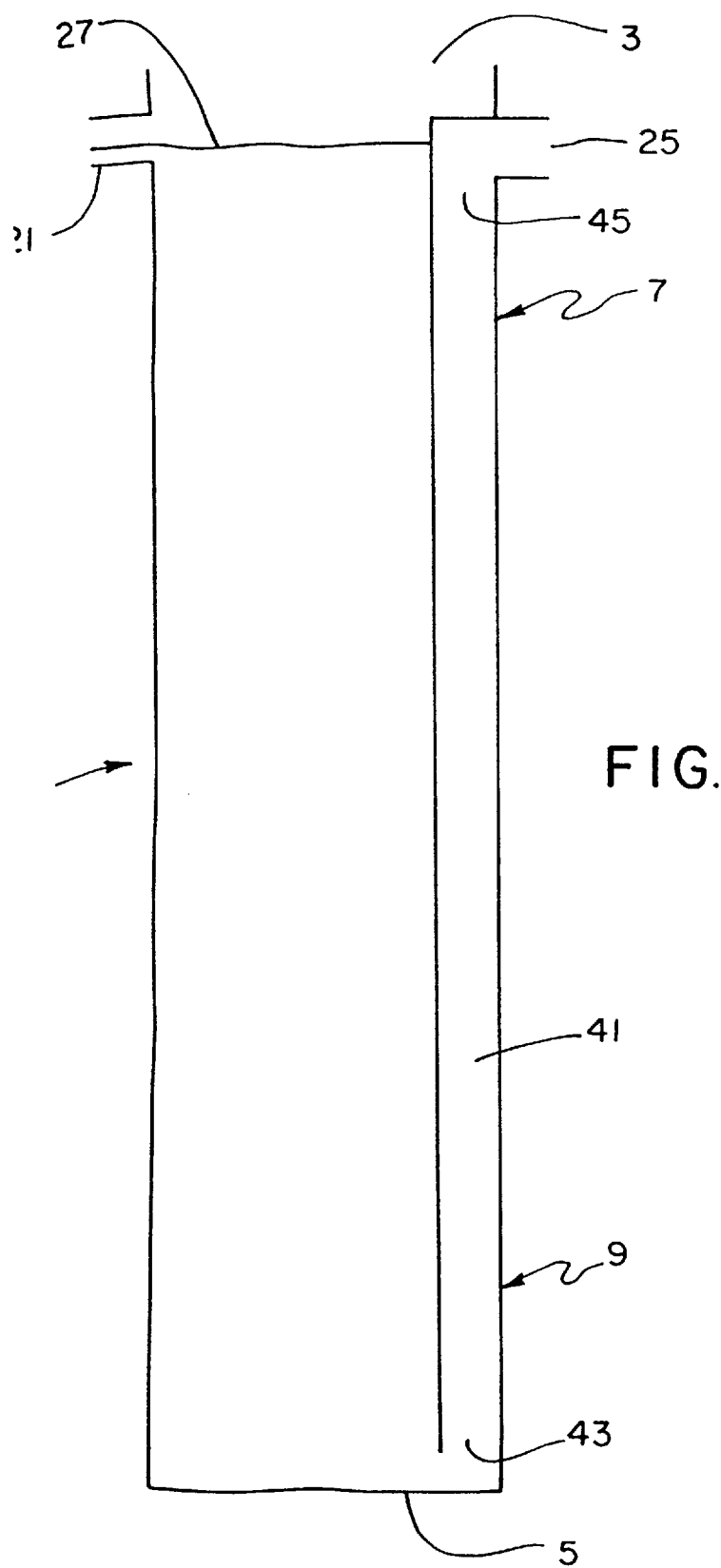
FIG. 1 is a schematic vertical cross-sectional view of an embodiment of a multi-directional flow gravity separator according to the invention.

The present invention provides a multi-directional flow gravity separator and a method for separating a mixture of two immiscible fluids of differing specific gravities. Typically, such a mixture is an oil-water mixture, and typically the oil is present at much lower proportions than is the water; the separator separates the oil from the water. However, the invention is not limited to the separation of oil from a mixture of oil and water, though it has great utility in this application.

The two fluids of different specific gravities comprise a fluid of higher specific gravity or density, which is referred to as a "heavier" fluid, and a fluid of lower specific gravity or density, which is referred to as a "lighter" fluid. By "immiscible" it is meant that the two fluids do not mix with each other, or form a solution; furthermore, the mixture is not an emulsion. Thus, a mixture of two such immiscible fluids generally consists of a suspension of droplets of the lighter fluid of varying sizes within the heavier fluid. In an open container and under the influence of gravity, the droplets of the lighter fluid begin to move upward within the heavier fluid. As these droplets move, they tend to collide with and merge with other lighter fluid droplets, forming larger droplets. These larger droplets continue moving upward, and, due to their larger size, attract and merge with additional droplets, thus increasing in size as they move upward in the heavier fluid. This process of merging and forming larger droplets of fluid is termed "coalescence." Eventually, the droplets of the lighter fluid reach the surface of the mixture, where the lighter fluid collects; a line of demarcation forms between the separated lighter and heavier fluid, which is the "interface" between the two immiscible fluids. The heavier fluid collects below the interface; it generally remains below the interface, although portions of heavier fluid which become entrapped by the coalescing lighter fluid appear in the collected lighter fluid; under the influence of gravity, these portions of heavier fluid tend to move downward through the collected lighter fluid and past the interface to the heavier fluid. When enclosed in an elongated tank, the lighter fluid will collect to a certain height above the interface, depending upon the amount of the lighter fluid present in the mixture, while the heavier fluid collects beneath the interface. The separated and collected fluid is also referred to as a "fraction." During the process of separation, a gradient of purity exists within each separated fraction of fluid. By "purity" it is meant the proportion of the other fluid entrapped within the collected fluid; the lower the proportion of entrapped other fluid, the higher the degree of purity of the collected fluid. The gradient of purity extends from the interface out; in other words, the purity of the separated, collected fluid is lowest at a point nearest to the interface, and increases as the distance from the interface increases.

The present invention provides a separator and a method, based upon fluid flow and gravity, which enhances the process of separation two immiscible fluids from a mixture of the two. The initial mixture is also referred to as a "source" fluid. The separation involves change in both the direction and the rate of the flow of the fluid mixture. Typically, the fluid flows in a substantially vertical direction; however, the invention is not limited to a vertical direction of fluid flow. The separator is referred to a "multi-directional flow gravity separator" to reflect the fact that the separator and method are based upon a change in direction in fluid flow, and that the separator is typically open to the atmosphere.

The separated fluids, which collect either above or below the interface, are typically removed from the separator. Removal of the lighter fluid may be referred to as "discharge" or "capture." Removal of the heavier fluid is referred to as "discharge," while the collected heavier fluid may also be referred to as "effluent," particularly when the heavier fluid is present in greater amounts in the original mixture. The separator results in capture of very high purity lighter fluid, and in discharge of highly pure effluent. Very high purity lighter fluid is referred to as "dry product." This terminology is used commonly in the separation of oil from an oil-water mixture, and refers to either the proportion of the original amount of water remaining in the oil, or to the absolute amount of water remaining in the oil. Very dry oil contains less than about 90% water by weight, and more preferably less than about 95%. Since separation of the two fluids results in removal of the lighter fluid from the heavier fluid, the separated heavier fluid is also referred to as "clarified," which means removal to some degree of the lighter fluid from the heavier fluid, as when the heavier fluid is present in greater proportions than is the lighter fluid in the original mixture. Highly clarified effluent water typically contains less than 10% oil by weight. The degree of purity of each separated fluid fraction achieved by the separator and the method of the invention depend upon the identity of the starting fluids and the amounts of each present in the mixture, upon the particular embodiment of the invention utilized, and upon the operating conditions of the separator.

In one aspect of the invention, the separator comprises a generally vertical elongated tank and an inlet means near the top end of the tank for introducing a mixture of two immiscible fluids with different densities. The mixture flows into the upper portion of the tank, which preferably initially contains heavier fluid before the separation of the two fluids begins. The lighter fluid rises to the top of the tank, where it is collected and discharged, whereas the heavier fluid flows to the bottom of the tank, where it is collected and discharged. The tank thus comprises means for discharging, or capturing, the collected lighter fluid; such means include an outlet in the upper portion of the tank, or a collection tube disposed to remove lighter fluid from its upper surface. The tank further comprises an elongated generally vertical effluent discharge tube of smaller inner diameter than the tank for discharging the collected heavier fluid, or effluent. The effluent discharge tube may be outside the tank, or within the tank, or it may surround all or a portion of the tank; preferably, the effluent discharge tube is located within the tank. The effluent discharge tube includes a lower end in fluid communication with the lower portion of the tank, and a means for discharging fluid from its other generally upper end to outside the tank; preferably, such means are a fluid discharge outlet. The heavier fluid is discharged from the lower portion of the tank by flowing into the lower end of the effluent discharge tube and upward, by gravity flow, and out the fluid discharge outlet. Gravity flow is due to the overhead volume of fluid, which depresses the fluid beneath it by gravity, causing the flow of the heavier fluid into and up the discharge tube. The height of the fluid discharge outlet controls the level of the fluid within the separator. Preferably, fluid flows continuously through the separator, and the lighter and heavier fluids are continuously discharged.

An embodiment of the invention will now be described in greater detail, with reference to the Figures. In this embodiment, shown generally in FIG. 1, the separator comprises a generally vertical elongated tank 1 with an open top end 3 and a closed bottom end 5. The tank further comprises an upper portion 7 just below the top end 3 and a lower portion 9 just above the bottom end 5. The tank 1 may be any configuration, but is preferably rectangular or square in cross section.

The separator further comprises inlet means (not shown) in the tank 1 for introducing a fluid mixture into the separator. The inlet means is preferably located in the upper portion 7 of the tank 1, and includes for example means for gravity feeding the mixture from above the separator into the upper portion 7 of the tank 1.

The tank further comprises outlet means for discharging, or capturing, the lighter fluid. Outlet means for the lighter fluid include a lighter fluid discharge port 21 in the upper portion 7 of the tank. In operation, the lighter fluid discharge port 21 is located above the interface between the two separated fluids and is configured such that the upper surface of the collected lighter fluid can flow through it. Other outlet means include a collection tube.

The separator further comprises an effluent discharge tube 41 for discharging heavier fluid collected in the lower portion 9 of the tank 1. The effluent discharge tube 41 may be outside the tank 1, or within the tank 1, or it may surround the tank 1; however, it must be in fluid communication with the lower portion 9 of the tank 1. Furthermore, the effluent discharge tube 41 may be in close proximity to a side of the tank 1, or it may be distant from any side of the tank 1. If in close proximity, it may be formed as an integral part of the tank 1. In the particular embodiment illustrated in FIG. 1, the effluent discharge tube 41 is set vertically within the tank 1, and has an open lower end 43 in the lower portion 9 of the tank 1; this open lower end 43 is in fluid communication with the lower portion 9 of the tank 1. The effluent discharge tube 41 also has an upper end 45 which is in fluid communication with an outlet means for the heavier fluid; such an outlet means includes an upper effluent discharge port 25 in the upper portion 7 of the tank 1. Thus, discharge of the heavier fluid begins from the lower portion 9 of the tank 1 but is completed at a level in about the upper portion 7 of the tank 1.

The effluent discharge tube 41 may be connected to the tank 1 by any of a number of means, either removably or permanently. Such means include struts or braces at either the top or the bottom of the tank 1, or along the sides of the tank 1 to which the effluent discharge tube 41 may be attached by bolts, clamps, or similar means. Alternatively, the effluent discharge tube 41 may be set within a supporting structure within the tank 1. Preferably, the effluent discharge tube 41 is welded into the tank 1, or formed integrally as a part of the tank 1. The upper effluent discharge port 25 may be further connected to means for carrying the effluent away from the tank 1. Such means include pipes, tubes, etc.

The tank 1 may be mounted in its operating environment in an upright position by any of a number of means. For example, the tank 1 may be mounted on a base, resulting in a free-standing separator (see, for example, FIG. 7, discussed subsequently). The base may be any configuration suitable to the environment in which the separator will be used. Alternatively, the tank 1 may be mounted to the side of a large tank which contains the source fluid. Additionally the tank 1 may be mounted remotely, including locations above, below or distant from the tank containing the source fluid.

In operation, the separator is connected to means for introducing a mixture of two immiscible fluids of different densities into the upper portion 7 of the tank 1 through an inlet means. Such means include tubing or piping connected to the inlet means from a pump, whereby the mixture is pumped into the inlet means, or tubing or piping such that the mixture is fed into the tank 1 by gravity flow, as for example from above the tank. The mixture flows into the tank, which is preferably initially filled with fluid, and most preferably with the heavier fluid, before beginning any particular separation. The initial height of the fluid initially present in the tank 1 is preferably slightly below the lighter fluid discharge port 21. During separation of the two fluids, the lighter fluid rises to the top portion 7 of the tank 1, whereas the heavier fluid flows to the bottom of the tank 1. Separation of the two immiscible fluids results in the formation of an interface between the two fluids. The lighter fluid collects above the interface, whereas the heavier fluid collects below the interface.

The separator may be operated in batch mode or continuously. When the separator is operated in batch mode, the fluids are discharged when a sufficient amount of either has been collected within the separator, but preferably when a sufficient amount of the lighter fluid has been collected. In batch mode separation, the lighter fluid may be discharged by raising the level of the heavier fluid such that the desired amount of the collected lighter fluid becomes high enough to reach and be discharged by the lighter fluid outlet means. Preferably, the separator is operated continuously; in this mode, the lighter fluid is discharged continuously once a sufficient amount of lighter fluid has been collected, so that the height of the collected lighter fluid reaches the outlet means, such as for example lighter fluid discharge port 21 in the upper portion 7 of the tank 1. The heavier fluid is also discharged continuously; when discharging the collected heavier fluid, the heavier fluid flows into the open lower end 43 of the effluent discharge tube 41 and upward by gravity flow, and out the upper effluent discharge port 25. The heavier fluid may be transported away from the separator, as for further processing, or it may be discharged back into the original source fluid, as for example when the separator is used to continuously clean a source fluid which is comprises a heavy fluid continuously contaminated by a lighter fluid.

The height of the upper effluent discharge port 25 is slightly lower than the height of the lighter fluid discharge port 21; this allows collection of very high purity lighter fluid from the upper surface of the collected lighter fluid. The difference in the relative heights of the two discharge ports takes advantage of the displacement of the heavier fluid by the collected purified lighter fluid. Thus, the lighter fluid collects above the interface where it forms a mat. As additional amounts of lighter fluid are collected inside the separator, the mat of lighter fluid increases in volume, and, as it is constrained by the cross-sectional inner area of the tank, the height of the mat above the interface increases. The weight of the collected lighter fluid then displaces the heavier fluid to a level which is lower than the level that the heavier fluid alone would have in the tank. At the same time, due to its lower density, the upper surface 27 of the lighter fluid is slightly higher than the level that the heavier fluid alone would have in the tank. Once the upper surface 27 of the mat of lighter fluid reaches the lighter fluid discharge port 21, the upper surface 27 begins to flow out. As previously described, due to the gradient of purity within the collected lighter fluid, the upper surface 27 of the mat contains the most highly purified lighter fluid.

The relative heights of the two discharge ports thus control how much lighter fluid is collected below the lighter fluid discharge port 21; the more lighter fluid which is collected, the greater the degree of purity of the fluid at its upper surface. Furthermore, the discharge rates of the lighter and heavier fluid together about equal the incoming flow rate of the mixture, to keep the amount of total fluid in the tank about constant.

The optimal discharge port positions and flow rates for different source fluids and conditions are easily determined by routine experimentation. In this embodiment, the change in the direction of the effluent discharge flow also serves to decrease turbulence in the separator, and thus to enhance fluid separation.

The presence of the effluent discharge tube 41 thus offers several advantages, including improved control over the level of fluid within the tank, improved control over the degree of purity of the captured lighter fluid, and enhanced fluid separation This results in increased capacity of the separator to capture lighter fluid of increased purity, as described in further detail below.

In another aspect of the invention, the separator comprises a generally vertical elongated tank as described previously and a generally vertical shroud, which is an elongated vessel, open at the top and closed at the bottom. The open top end of the shroud is in fluid communication with the upper portion of the tank. The shroud is located in relation to the tank such that fluid from the shroud can spill from the open top end of the shroud into the upper portion of the tank. If the shroud is adjacent to the tank, then the shroud is connected to tank such the outflow of fluid from the shroud enters the tank near the upper portion of the tank. Preferably, the shroud is located within the tank, such that its closed bottom end is slightly above the closed bottom end of the tank, and the open top of the shroud is within the upper portion of the tank; most preferably the shroud is set vertically within the tank. The cross sectional inner area of the shroud is less than the cross sectional inner area of the tank.

The separator further comprises a means for introducing a mixture of two immiscible fluids of different densities into the separator; preferably, the means comprises an inlet pipe, where the inlet pipe has on open first end outside the tank and a second end. The inlet pipe receives the mixture at its open first end, and delivers it to the separator through its second end. The second end of the pipe is in fluid communication with the shroud at or near the closed bottom end of the shroud. The pipe may be exterior to the shroud, and connected at or near the closed bottom end of the shroud, as for example when the inlet pipe is adjacent to the shroud, and the second end of the pipe is piped into the lower portion of the shroud. Preferably, the inlet pipe is set within the shroud, and the open first end is set above the open top end of the tank, and the second end of the inlet pipe is an open lower end set slightly above the closed bottom of the shroud; most preferably the inlet pipe is set vertically within the shroud. The cross sectional inner area of the inlet pipe is less than the cross sectional inner area of the shroud The tank further comprises means for discharging, or capturing, the collected lighter fluid; such means include an outlet or discharge port in the upper portion of the tank, or a collection tube disposed to remove lighter fluid from its upper surface. The tank also comprises means for discharging the collected heavier fluid; such means include an outlet in the lower portion of the tank, or in the closed bottom end of the tank.

The mixture flows into the first open end of the inlet pipe and out the second end into the bottom of the shroud. Because the cross sectional area of the inlet pipe is less than that of the shroud receiving the fluids, the flow rate of the mixture decreases significantly at the discharge of the smaller inlet pipe into the larger shroud. The direction of flow also changes, from an initial direction, which is preferably downward, in the inlet pipe, to upward in the shroud. The decrease in flow rate and change in flow direction is believed to cause the droplets of the lighter fluid to coalesce into larger droplet sizes. As the mixture flows up the shroud, the coalescing droplets of lighter fluid are believed to rise faster and coalesce further while constrained within this upward flow passage. The mixture of coalesced lighter fluid droplets and clarified heavier fluid is discharged at the open top end of the shroud into the upper portion of the tank, which preferably initially contains heavier fluid before beginning the separation of the two fluids.

An additional coalescing step occurs at this point in the fluid flow path, due to the change in flow direction and rate; this change is a downward flow of the mixture, and a decrease in the fluid flow rate, created by discharging the fluid mixture from the smaller cross sectional area shroud into the larger cross sectional area tank which receives the flow from the shroud. This significant decrease in flow rate occurring near the upper portion of the tank is believed to result in further coalescence of droplets of lighter fluid, allowing an enhanced separation of the heavier fluid as the mixture flows in a downward path toward the lower portion of the tank. Further separation of the two fluids occurs as the heavier fluid flows toward the bottom of the tank, with lighter fluid further coalescing during this downward flow and rises back up toward the top of the tank. The heavier fluid collects at the bottom of the tank, where it may be collected and discharged. The level of the fluid within the tank is controlled by several factors, which include the rate of entry of the mixture, and rate of discharge of the effluent, and the level of the outlet means for discharging the lighter fluid. Preferably, fluid flows continuously through the separator, and the lighter and heavier fluids are continuously discharged.

Figure 2:
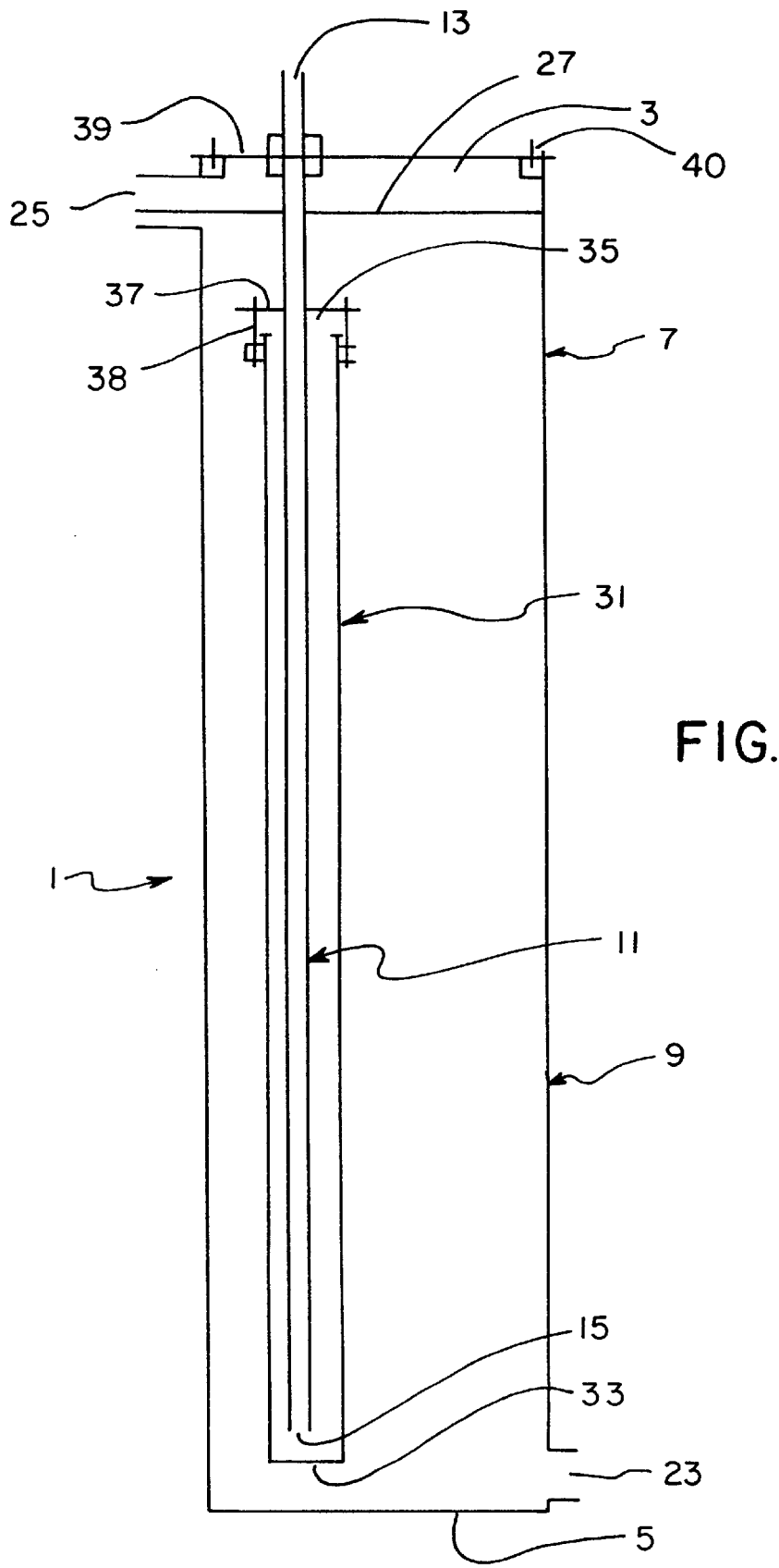
FIG. 2 is a schematic vertical cross-sectional view of an alternative embodiment of a multi-directional flow gravity separator according to the invention.

An embodiment of this aspect of the invention will now be described in greater detail, with reference to the Figures. In this embodiment, shown generally in FIG. 2, the separator comprises a generally vertical elongated tank 1 as previously described; the tank may be mounted in its operating environment also as previously described. The separator further comprises a generally vertical shroud 31, which is an elongated vessel, preferably tubular or cylindrical in shape, with a cross-sectional inner area which is smaller than that of the tank 1. The shroud 31 has a closed bottom end 33 and an open top end 35 which is in fluid communication with the upper portion 7 of the tank 1. The shroud 31 may be located outside or inside the tank 1, so long as its open top end 35 is in fluid communication with the upper portion 7 of the tank 1. Preferably, the shroud 31 is set within the tank 1, with its open top end 35 located slightly below the open top end 3 and within the upper portion 7 of the tank 1, and preferably with its closed bottom end 33 located within the lower portion 9 of the tank 1.

The shroud 31 may be attached to the tank 1 by any of a number of means; preferably, it is attached such that it may easily be removed. Such attachments include struts or braces at either the top or the bottom of the tank 1, to which the shroud 31 may be attached by bolts, clamps, or similar means. Alternatively, the shroud 31 may be set within a supporting structure within the tank 1.

The separator further comprises means for introducing a fluid mixture into the shroud 31 at or near its closed bottom end 33. Such means include piping or tubing, which may be located inside or outside the shroud 31. If located outside the shroud 31, such means must have access to the shroud, as via an inlet located at or near the closed bottom end 33 of the shroud 31. Preferably, the means comprise an inlet pipe 11 set within the shroud 31, where the pipe comprises an open upper end 13 and an open lower end 15. The open upper end 13 of the inlet pipe 11 is above the open top end 3 of the tank 1, and the open lower end 15 of the inlet pipe 11 is set slightly above the closed bottom end 33 of the shroud 31. The inlet pipe 11 may be any configuration, but is preferably cylindrical; the cross-sectional inner area of the inlet pipe 11 is also less than that of the shroud 31.

The inlet pipe 11 may be attached to the tank 1 or to the shroud 31 by various means, including supports, braces or brackets; preferably such attachments are removable. If attached to the tank 1, the inlet pipe 11 is preferably removably attached to the tank 1. As an example, the inlet pipe 11 may be threaded, and screwed into a bracket 39; the bracket 39 may then extend across the open top end 3 of the tank 1. The bracket 39 may be configured to sit upon the side walls at the top end 3 of the tank 1, or it may be attached to the open top end 3 of the tank 1, for example with bolts 40 or clamps. Alternatively, such a bracket 39 may be attached to tank 1 within the upper portion 7 of the tank.

If attached to the shroud 31 which is then attached to the tank 1, the inlet pipe 11 may be attached to the shroud 31 by any number of means; preferably, it is attached such that it may be easily removed. Such attachments include struts, braces, or brackets at either the top or the bottom of the shroud 31, to which the inlet pipe 11 may be attached by bolts, clamps, or similar means. Alternatively, the shroud 31 may be attached to the inlet pipe 11, and the inlet pipe 11 then attached to the tank 1; preferably, the shroud 31 is removably attached to the inlet pipe 11, and the inlet pipe 11 is removably attached to the tank 1. As an example, the inlet pipe 11 may be threaded, and screwed into a bracket 39; the bracket 39 may then extend across the open top end 3 of the tank 1 to which it is attached, or it may be attached to tank 1 within the upper portion 7 of the tank 1, as described above. The shroud 31 may then be attached to the inlet pipe 11, for example by bolts.

The separator may further comprise a splash guard 37 exterior to the inlet pipe 11 near its upper end 13 and over and slightly above the open top end 35 of the shroud 31. The splash guard 37 is generally planar in shape, and generally horizontal in use. It may be attached to the upper end 35 of the shroud 31, or to the inlet tube 11, or to both, either permanently or removably, by such means which include bolts or clamps, or welding. The splash guard 37 may also serve to connect the inlet pipe 11 to the shroud 31, or the shroud 31 to the tank 1. As an example, the splash guard 37 may be connected to the inlet pipe 11 by welding, and it may also be connected to the shroud 31 by bolts 38 which extend downward from the splash guard 37 to bolt holes near the open top end 35 of the shroud 31. In this example, the shroud 31 is removably attached to the inlet pipe 11 by the splash guard 37. The inlet pipe 11 is then removably attached to a bracket 39 which is then attached to the tank 1. Thus, the shroud 31 and the inlet tube 11 may be detached from the tank 1 as a single unit, by unbolting the bracket 39 from the tank 1. The inlet pipe 11 may be further removed from the shroud 31 by unbolting the shroud 31 from the splash guard 37. Removal of these components allows independent access to the tank 1 and to the shroud 31 and to the inlet pipe 11, for inspection and routine maintenance. Such removal also allows the replacement of the components by the same or different like components, or simply the removal of some but not all of the components.

The separator further comprises outlet means for discharging, or capturing the lighter fluid, and outlet means for discharging the clarified heavier fluid, or effluent. Outlet means for discharging the lighter fluid include a lighter fluid discharge port 21 in the upper portion 7 of the tank 1, which in operation is located above the interface between the two separated fluids and through which the lighter fluid can flow. Other outlet means include a collection tube disposed to remove lighter fluid from its upper surface. Outlet means for the heavier fluid include a lower effluent discharge port 23 in the lower portion 9 of the tank 1, or in the closed bottom end 5 of the tank 1, through which the heavier fluid can drain out from the tank 1. The effluent discharge port 23 may further contain means to vary the discharge rate, such as for example valves. The ports 21 and 23 may be variously configured, including being connected to tubing or piping through which the discharged fluid can be transferred to other containers. The outlet means can be configured to discharge the two fluids in a batch, or to discharge the fluids continuously; preferably, the two fluids are discharged continuously.

In operation in this embodiment, the separator is connected to means for delivering a mixture of two immiscible fluids of different densities into the closed bottom end 33 of the shroud. Preferably, the mixture is introduced into the open upper end 13 of the inlet pipe 11, where it flows into the upper end 13 of the inlet pipe 11 and out the open lower end 15 of the inlet pipe 11 into the closed bottom end 33 of the shroud 31. Because the inlet pipe 11 has a smaller cross sectional inner area than does the shroud 31, the flow rate of the mixture decreases when the mixture flows from the inlet pipe 11 into the larger shroud 31. Furthermore, the direction of the fluid flow path changes at the point of delivery of the mixture into the closed bottom end 33 of the shroud 31; in this embodiment, the direction changes from downward in the inlet pipe 11 to upward in the shroud 31. This change in direction and decrease in flow rate is believed to enhance the observed process of the droplets of the lighter fluid coalescing into larger droplet sizes. As the mixture flows up the shroud 31, the coalescing droplets of lighter fluid rise faster and coalesce further while constrained within this upward flow passage. The mixture which now contains coalesced droplets of lighter fluid is discharged at the top of the shroud 31 into the upper portion 7 of the tank 1, which is preferably filled with fluid, and most preferably with the heavier fluid.

An additional enhancement of the coalescence is observed at this point in the fluid flow path, which is believed to be due to the change both in the fluid flow rate and in the path direction as the mixture is discharged from the shroud 31 into the tank 1. This change is the downward flow direction of the mixture, and a decrease in fluid flow rate, and is created by discharging the upward flowing fluid mixture from the smaller cross sectional inner area of the shroud 31 into the larger cross sectional inner area of the tank 1, which receives the flow from the open top end 35 of the shroud 31. This decrease in flow rate which occurs in the upper portion 7 of the tank 1 is believed to result in the observed further coalescence of droplets of lighter fluid, resulting in further clarification of the heavier fluid as the mixture flows in a downward direction toward the lower portion 9 of the tank 1. That is, some proportion of lighter fluid remains entrapped within the heavier fluid which is discharged from the shroud 31 into the tank 1, and as it begins to flow down toward the lower portion 9 of the tank 1. The residual droplets of lighter fluid continue to coalesce during this downward flow of the heavier fluid; the coalescing droplets flow back up toward the upper portion 7 of the tank 1. As the coalescing droplets flow against the flow of the heavier fluid, they pick up additional droplets of lighter fluid, thus setting up a countercurrent separation of the lighter from the heavier fluid. The clarified heavier fluid collects at the bottom of the tank, where it may be collected and discharged, as for example through the lower effluent discharge port 23.

As previously described, the separation of the two fluids results in the formation of an interface between the two fluids. The lighter fluid collects above the interface, whereas the heavier fluid collects below the interface. The separator may be operated in a batch mode, or continuously. When the separator is operated in batch mode, the fluids are discharged when a sufficient amount of either fluid has been collected within the separator. In this mode, the lighter fluid may be collected by raising the level of the heavier fluid a sufficient amount to allow the desired amount of the collected lighter fluid to be discharged in one batch; for example, raising the level of the heavier fluid raises the upper surface 27 of the lighter fluid, which can then flow out the lighter fluid discharge port 27. Preferably, the separator is operated continuously; in this mode, the lighter fluid is discharged continuously once a sufficient amount has been collected, so that the height of the collected lighter fluid reaches the outlet means, such as for example the lighter fluid discharge port 21 in the upper portion 7 of the tank 1. The heavier fluid is also discharged continuously, and the rate of discharge of both the lighter and heavier fluid is controlled so as to keep the surface of the fluid in the tank at a certain level, and to keep the interface between the two different fluids at a certain distance below the lighter fluid discharge port 21 in the upper portion 7 of the tank 1. The rate of discharge of the heavier fluid may be controlled, as for example by controlling the size of the outlet for passive discharge of the fluid by gravity, or by other means, such as with valves or by pumping the heavier fluid out. Controlling the distance between the interface and the point at which the lighter fluid is discharged allows control over the purity of the lighter fluid which is withdrawn, which is discussed more completely subsequently.

The splash guard 37 is a means of decreasing turbulence within the tank 1 in the upper portion 7 and specifically for deflecting turbulence away from the lighter fluid discharge port 21 when discharging the lighter fluid from the tank 1. Decreasing turbulence decreases re-mixing of the separated fluids, and decreases mixing of the zones or gradients within the separated lighter fluid, as discussed further subsequently, thus improving the consistency of the discharged lighter fluid through the lighter fluid discharge port 21.

The operation of this aspect of the invention results in a greater degree of separation of the two different fluids, which results in collected fluids of a higher degree of purity; it is thought that this improved separator performance is due to the multiple directions of the fluid flow path and the multiple rates of fluid flow.

In another aspect of the invention, the separator comprises both aspects of the invention as previously described. Thus, the separator comprises a generally vertical elongated tank, a generally vertical shroud, a means for introducing a mixture into the shroud, and an effluent discharge tube for discharging the heavier fluid collected in the lower portion of the tank, all as previously described. The tank further comprises means for discharging, or capturing, the collected lighter fluid, also as previously described.

Thus, in operation, the mixture of two immiscible is delivered to the closed bottom end of the shroud, where the flow direction and flow rate of the mixture both undergo a change. As a result, coalescence of the lighter fluid is enhanced as the mixture then flows generally upward in the shroud to the open top end, where it spills out into the tank. At this juncture, the flow direction and flow rate again undergo a change, as the mixture begins to flow down toward the closed bottom end of the tank. Further clarification of the heavier fluid occurs as the mixture flows toward the bottom of the tank, with lighter fluid further coalescing during this downward flow and rises back up toward the top of the tank. The heavier fluid collects in the lower portion of the tank, and is then discharged via the discharge outlet tube. The lighter fluid collects in the upper portion of the tank, where it is discharged by any of several means, including a lighter fluid discharge port or a collection tube.

An embodiment of this aspect of the invention will now be described in greater detail, with reference to the Figures. The separator comprises a tank 1, a shroud 31, an inlet means, preferably as an inlet pipe 11, and an effluent discharge tube 41, as previously described and as generally shown in a preferred embodiment in FIG. 3. However, other configurations are possible, also as previously described, for each of the tank 1, the shroud 31, the inlet pipe 11, and the effluent discharge tube 41.

Figure 3:
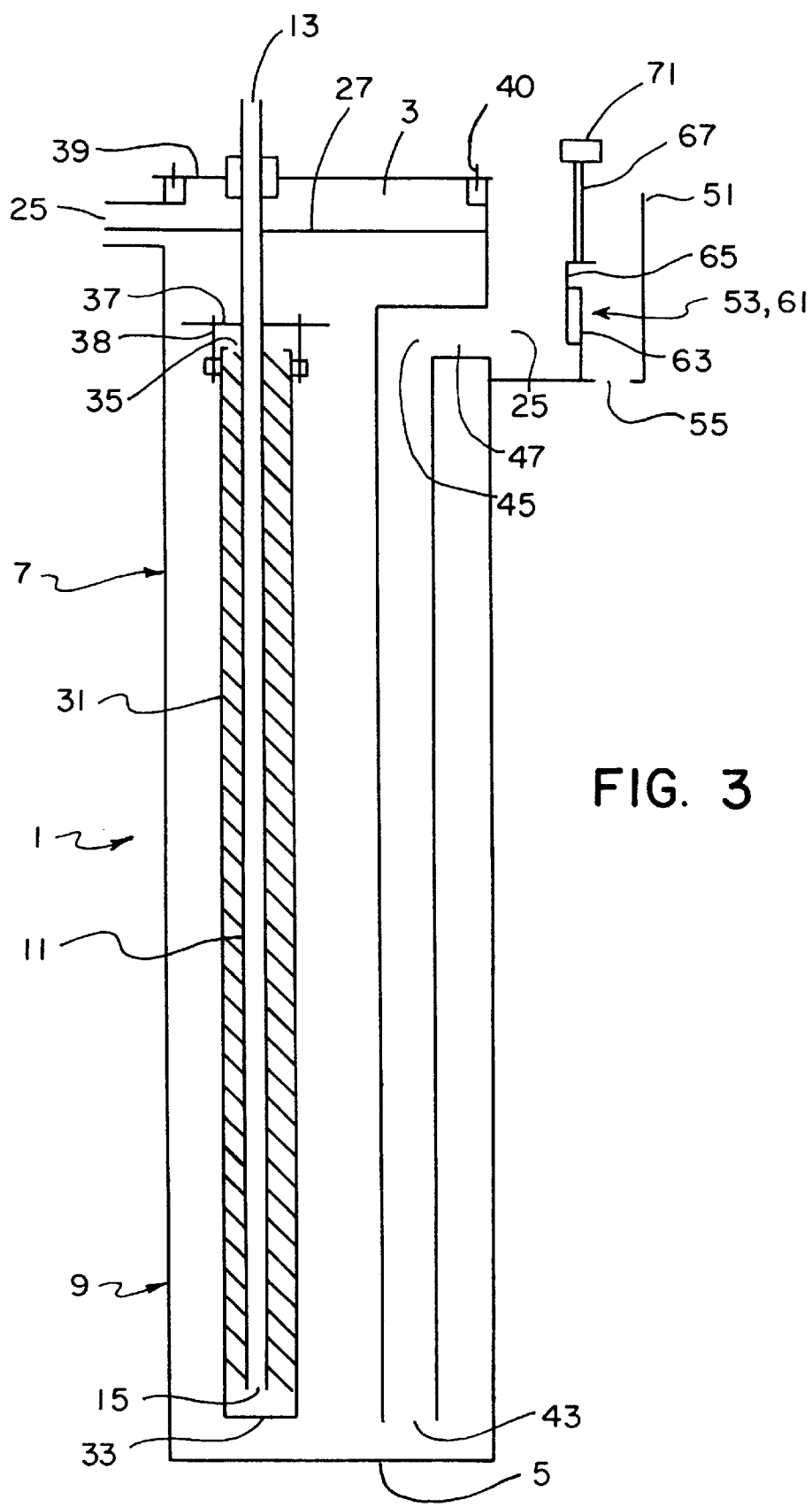
FIG. 3 is a schematic vertical cross-sectional view of an alternative and preferred embodiment of a multi-directional flow gravity separator according to the invention.

In summary, in this embodiment, shown generally in FIG. 3, the separator comprises a generally vertical elongated tank 1 as previously described; the tank may mounted in its operating environment also as previously described. The separator further comprises a generally vertical shroud 31, as previously described, which is preferably set within the tank 1, with its open top end 35 located slightly below the open top end 3 and within the upper portion 7 of the tank 1, and preferably with its closed bottom end 33 located within the lower portion 9 of the tank 1. The shroud may be any configuration, but is preferably cylindrical. The shroud 31 may be attached to the tank 1 as previously described. The separator further comprises means for introducing a fluid mixture into the shroud 31 at or near the closed bottom end 33, as previously described. Such means preferably comprise an inlet pipe 11 set within the shroud 31, as previously described where the open upper end 13 of the inlet pipe 11 is above the open top end 3 of the tank 1, and the open lower end 15 of the inlet pipe 11 is set slightly above the closed bottom end 33 of the shroud 31. The inlet pipe 11 may be any configuration, but is preferably cylindrical; the cross-sectional inner area of the inlet pipe 11 is also less than that of the shroud 31.

The inlet pipe 11 may be attached to the tank 1 or to the shroud 31 by any of various means, as previously described; preferably, such attachments are removable. More preferably, the inlet pipe 11 is attached to the tank, where it is threaded and screwed into a bracket 39, and where the bracket 39 extends across the open top end 3 of the tank 1 and is attached to the open top end 3 of the tank 1 by means of bolts 40.

If attached to the shroud 31 which is connected to the tank, the inlet pipe 11 may then be attached to the shroud 31 by any number of means, as previously described; preferably, it is attached such that it may be easily removed. Alternatively, the shroud 31 may be attached to the inlet pipe 11, and the inlet pipe 11 then attached to the tank 1; preferably, the shroud 31 is removably attached to the inlet pipe 11, and the inlet pipe 11 is removably attached to the tank 1. More preferably, the inlet pipe 11 is attached to the tank, where it is threaded and screwed into a bracket 39, and where the bracket 39 extends across the open top end 3 of the tank 1 and is attached to the open top end 3 of the tank 1 by means of bolts 40. The shroud 31 may then be attached to the inlet pipe 11, for example by bolts.

The separator may further comprise a splash guard 37, as previously described, which may be attached to the inlet pipe 11, the shroud 31, and the tank 1 as previously described. Preferably, the splash guard 37 is attached to the inlet pipe 11 by welding, and it is connected to the shroud 31 by bolts 38 which extend downward from the splash guard 37 to bolt holes near the open top end 35 of the shroud 31. Thus, the shroud 31 is removably attached to the inlet pipe 11 by means of the splash guard 37, and the inlet pipe 11 is removably attached to the tank 1 by means of the bracket 39. Thus, as previously described, the shroud 31 and the inlet tube 11 may be detached from the tank 1 as a single unit, by unbolting the bracket 39 from the tank 1. The inlet pipe 11 may be further removed from the shroud 31 by unbolting the shroud 31 from the splash guard 37. Removal of these components allows independent access to the tank 1 and to the shroud 31 and to the inlet pipe 11, for inspection and routine maintenance. Such removal also allows the replacement of the components by the same or different like components, or simply the removal of some but not all of the components.

The separator further comprises an effluent discharge tube 41 for discharging clarified heavier fluid, or effluent, collected in the lower portion 9 of the tank 1; the configurations of the effluent discharge tube 41 and its attachment to the tank 1 have been described previously. Preferably, the effluent discharge tube 41 is set vertically within the tank 1, and has an open lower end 43 in the lower portion 9 of the tank 1; this open lower end 43 is in fluid connection with the lower portion 9 of the tank 1. The effluent discharge tube 41 also has an upper end 45 which is in fluid communication with an outlet means for the heavier fluid; such an outlet means includes an upper effluent discharge port 25 in the upper portion 7 of the tank 1. When the effluent discharge tube 41 is not immediately adjacent to a wall of the tank 1, the means by which the upper end 45 of the effluent discharge tube 41 is in fluid communication with an upper effluent discharge port 25 includes a cross tube 47, which is connected to both the upper end 45 of the effluent discharge tube and the upper effluent discharge port 25, as shown in FIG. 3.

The separator further comprises outlet means for discharging, or capturing the lighter fluid. Outlet means for discharging the lighter fluid include a lighter fluid discharge port 21 in the upper portion 7 of the tank 1, which in operation is located above the interface between the two separated fluids and through which the lighter fluid can flow. Other outlet means include a collection tube collection tube disposed to remove lighter fluid from its upper surface.

Thus, in operation of this embodiment, separation of the mixture of two immiscible fluids occurs as previously described for a separator comprising a tank 1, an inlet pipe 11, and a shroud 31, resulting in collection of the lighter fluid in the upper portion 7 of the tank 1 and in collection of the heavier fluid in the lower portion 9 of the tank 1. The separator may be operated in batch mode, as previously described, or continuously; preferably, the separator is operated continuously. When a sufficient amount of lighter fluid has been collected, the lighter fluid is discharged from its upper surface. For example, when the level of the lighter fluid reaches the height of the lighter fluid discharge port, the lighter fluid begins to flow through the port 21. Discharge of the heavier fluid occurs by gravity flow of the fluid into the lower open end 43 of the effluent discharge tube 41 and upward to the upper end 45 and across the cross tube 45 to the upper effluent discharge outlet 25. The level of the fluid within the separator is controlled by the relative positions of the upper effluent discharge outlet 25 relative to the level of the lighter fluid discharge port 21; the level of the lighter fluid discharge port 21 is slightly above the level of the upper effluent discharge port 25, as previously described. Furthermore, the discharge rates of the lighter and heavier fluid together about equal the incoming flow rate of the mixture, to keep the amount of total fluid in the tank about constant. Optimizing these parameters, for flow rates and discharge levels, for any particular types of fluids and fluid mixtures, is routine.

The operation of this aspect of the invention results in even greater separation of the two different fluids, which results in collected fluids of a high degree of purity; it is thought that this improved separator performance is due in part to the multiple directions of the fluid flow path and the multiple rates of fluid flow. The presence of the effluent discharge tube offers the additional advantage of improved control of the discharge rate of the heavier fluid when the system is operating by gravity flow. It also offers improved control over the level of fluid within the tank, and improved control over the amount of lighter fluid which is discharged, and the height above the interface at which the lighter fluid is discharged, and thus the purity of the lighter fluid which is discharged, as is explained more fully subsequently.

In another aspect of the invention, any of the separators as previously described which comprises an effluent discharge tube further comprises a weir in fluid communication with and downstream of the upper effluent discharge port which is connected to the upper end of the effluent discharge tube. The weir is contained within a weir housing into which the effluent is discharged from the upper effluent discharge port; the weir housing also comprises a weir effluent discharge outlet downstream of the weir. The height of the weir then controls the height of the fluid within the separator.

An embodiment of this aspect of the invention will now be described in greater detail, with reference to the Figures. In this aspect of the invention, the effluent discharge means for the effluent discharge tube 41further comprises a weir 53 in fluid communication with the effluent discharge means and downstream of the effluent discharge means, as shown in FIG. 3. The weir 53 is contained within a weir housing 51. The weir housing may be any configuration, and it may be within or outside the tank 1. If outside the tank 1, the weir housing 51 may be immediately adjacent to the tank 1 or at some distance from the tank 1. If immediately adjacent to the tank 1, either within the tank 1 or outside of it, the weir housing is preferably attached to the wall of the tank 1; it may formed as an integral part of the tank 1, or it may be permanently attached to the tank, such as by welding, or it may be removably attached to the tank, such as by bolts, clamps, or the like. As shown in FIG. 3, the weir housing 51 is integrally formed as part of the outside wall of the tank 1.

The weir housing 51 comprises a weir 53 downstream of the upper effluent discharge port 25, and a weir effluent discharge means, such as a port 55, downstream of the weir 53. Formation of the weir is well known in the art; it is perpendicular to the flow of the discharged heavier fluid. The weir effluent discharge port 55 may be located in the bottom of the weir housing, or in the side of the weir housing 51; preferably, it is located in the bottom of the weir housing.

In operation of this aspect of the invention, separation of the mixture of two immiscible fluids occurs as previously described for any of the embodiments where the separator comprises an effluent discharge tube 41. The result is collection of the lighter fluid in the upper portion 7 of the tank 1 and collection of the heavier fluid in the lower portion 9 of the tank 1. The separator may be operated in batch mode, as previously described, or continuously; preferably, the separator is operated continuously. When discharging the collected heavier fluid, or effluent, from the lower portion 9 of the tank 1, the effluent flows into the open lower end 43 of the effluent discharge tube 41 and upward under gravity flow and out the effluent discharge port 25 into the weir housing 51, over the weir 53, and out the weir effluent discharge port 55. The level of the fluid within the separator is then determined by the relative positions of the top of the weir 53 relative to the level of the lighter fluid discharge port. Optimizing these parameters, for flow rate and discharge levels, for any particular types of fluids and fluid mixtures is routine.

Thus, the presence of the weir 53 also offers improved control over the level of fluid within the tank 1, and improved control over the amount of lighter fluid which is discharged, and the height above the interface at which the lighter fluid is discharged, and thus the purity of the lighter fluid which is discharged, as is explained more fully below.

In another aspect of the invention, any of the separators as previously described which comprises a weir in fluid communication with and downstream of the upper effluent discharge port further comprises a variable weir. The level of the weir may be varied to control the level of the fluid within the separator between operations and during operation.

The level of the fluid within the separator, relative to the level of the point at which the lighter fluid is collected, determines the relative purity of the lighter fluid which is collected. By purity it is meant the relative amount of heavier fluid which remains in the collected lighter fluid; the less the heavier fluid, the purer the lighter fluid. As the amount of the lighter fluid collected increases, the height of the collected lighter fluid above the interface between the two fluids increases. When the system is running continuously, the degree of purity of the lighter fluid increases as its distance from the interface increases. Thus, the purity of the discharged lighter fluid depends upon both the height of the collected fluid from the interface, and the distance from the interface at which it is collected; the higher the collected fluid, and the further from the interface, the purer the discharged lighter fluid. A variable weir allows the height of the fluid within the separator to be adjusted before operation of the separation, or even during operation of the separator, thus allowing the height of the collected lighter fluid and of the discharge point of the lighter fluid relative to the interface between the two fluids to be adjusted before or during operation of the separator, to allow the discharge or capture of the highest degree of purity of lighter fluid possible in the operating environment.

An embodiment of this aspect of the invention will now be described in greater detail, with reference to the Figures. In this aspect of the invention, any of the separators as previously described which comprise a weir further comprises an adjustable weir 61, as shown in FIG. 3.

An adjustable weir 61 is any means by which the height of the weir may be increased or decreased, either manually or automatically. Adjustable weirs are well-known in the art. Typically, an adjustable weir is located perpendicular to the flow of the discharged heavier fluid, and comprises a fixed wall 63 which rises from the bottom of the weir housing 51 to a predetermined height in the weir housing 51, and which extends to either opposite wall. An adjustable weir further comprises a second movable wall 65 parallel to and adjacent to the fixed wall 63 and in such close proximity to the fixed wall 63 that it forms a fluid impermeable barrier to the flow of a fluid in the weir housing 51, such that the fluid must flow over the weir 61. The second movable wall 65 may be upstream or downstream of the effluent discharge flow; preferably, it is upstream. The impermeable barrier may be achieved or enhanced by the presence of a gasket between the fixed and movable walls. Means are connected to the movable wall 65 to adjust the height of the wall up and down, relative to the top of the weir housing 51. As an example, the means to adjust the height of the movable wall 65 is a threaded bolt 67 attached to the top of the movable wall 65; the bolt is screwed into a bracket 69 which extends across the weir housing 51 directly above the weir 61. The means to adjust the height of the movable wall further comprises means for turning the bolt 67, such as a cap 71. The bracket 69 is either permanently or removably attached to the weir housing 51 by any number of means, such as bolts, clamps, or welding. The height of the adjustable weir 61 is then varied by turning the bolt 67, and raising or lowering the movable wall 65, thus increasing or decreasing the height of the adjustable weir 61.

In operation in this embodiment, separation of the mixture of two immiscible fluids occurs as described above for any of the embodiments described previously which comprise a weir 53. The separator may be operated in batch mode or continuously; preferably, the separator is operated continuously. When discharging the collected heavier fluid, the heavier fluid flows into the open lower end 43 of the effluent discharge tube 41 and upward by gravity flow and out the upper effluent discharge port 25 into the weir housing 51, over the adjustable weir 61, and out the weir effluent discharge outlet 55. The level of the fluid within the separator is then determined by the relative positions of the top of the weir 53 relative to the level of the lighter fluid discharge port, as well by fluid flow rates. Optimizing these parameters, for flow rate and discharge levels, for any particular types of fluids and fluid mixtures is routine.

Further control of the level of the fluid in the tank 1 is achieved by the height of the adjustable weir 61, which may be adjusted in order to achieve optimal control over the fluid level in the tank. This allows more precise control over the degree of purity of the discharged lighter fluid both before operation and when the system is operating, in order to compensate for changes in other variables during separation of the two fluids.

In all the embodiments of the invention described above, when the separator is operating continuously, discharge of the lighter fluid, and the degree of purity of the lighter fluid, may be controlled by controlling the level of the fluid within the separator, and by controlling the height at which the lighter fluid is discharged. By "purity" of the lighter fluid it is meant the relative amount or proportion of heavier fluid which remains within the collected lighter fluid; the less the heavier fluid, the purer the lighter fluid. Separation of the two fluids results in an interface between the two fluids. However, due to the dynamic nature of two separated fluids in a moving system, some amount of heavier fluid remains entrapped in the collected lighter fluid above the interface. The amount of entrapped heavy fluid is greatest just above the interface, and decreases as the distance from the interface increases. Thus, a "gradient" exists with respect to the amount of heavier fluid entrapped within the lighter fluid and the height of the lighter fluid above the interface, from the greatest amount of heavier fluid just above the interface to a vanishingly small amount at the top of the collected lighter fluid. As the height of the collected lighter fluid above the interface increases, the amount of highly pure lighter fluid near the top of the collected fluid increases. Discharging the lighter fluid from near the top of the collected fluid results in the discharge of highly pure lighter fluid; the greater the distance from the interface the lighter fluid is discharged, the greater the purity of the discharged lighter fluid, and the less likely that perturbations in the systems will affect the purity of the discharged fluid. Thus, by increasing the distance from the interface that the lighter fluid is discharged, high purity lighter fluid is more reliably discharged when the system is running. Control of these parameters can all be achieved with a separator of the present invention, resulting in the reliable discharge of highly pure lighter fluid.

For example, when the lighter fluid is discharged through an lighter fluid discharge port 21, the discharge of the fluid is controlled by the location of the port 21 in the upper portion 7 of the tank 1. The port 25 is generally positioned slightly below the lighter fluid discharge port 21, such that a certain amount of the lighter fluid must be collected, or in other words, so that the collected lighter fluid must reach a certain height in order to reach the port 21. The height of the collected lighter fluid is determined by the total fluid level in the tank 1, by the height of the interface within the tank 1, and by the relative heights of the lighter fluid discharge port 21 and of the upper effluent discharge port 25. Thus, by controlling the level of fluid within the tank 1 relative to the lighter fluid discharge port 21, and by controlling the distance of the interface from the level of port 21 for the lighter fluid, it is possible to increase the height of the lighter fluid above the interface, and by discharging only the upper regions of the lighter fluid, it is possible to collect highly pure fractions of the lighter fluid.

The presence of a weir 53 allows further control of the height of the total fluid within the tank 1. An adjustable weir 61 allows more precise control of the height of the fluid within the separator, thus allowing more precise control of the height of the collected lighter fluid and of the discharge point of the lighter fluid.

Likewise, reliable discharge of highly pure heavier fluid is also achieved with a separator of the invention.

In another aspect of the invention, the shroud of any of the embodiments previously described above further comprises a coalescer to enhance coalescence of the lighter fluid from the mixture during the flow of the mixture through the shroud, and thus to enhance separation of the two different fluids. Preferably, the coalescer is a helical spiraled vane; more preferably, an inlet pipe is set within the shroud, and the helical spiraled vane surrounds the inlet path to form a helical flow path for the mixture. Together, the inlet pipe, the surrounding shroud, and the presence of a coalescer form a bi-directional flow gravity coalescer.

Figure 5:
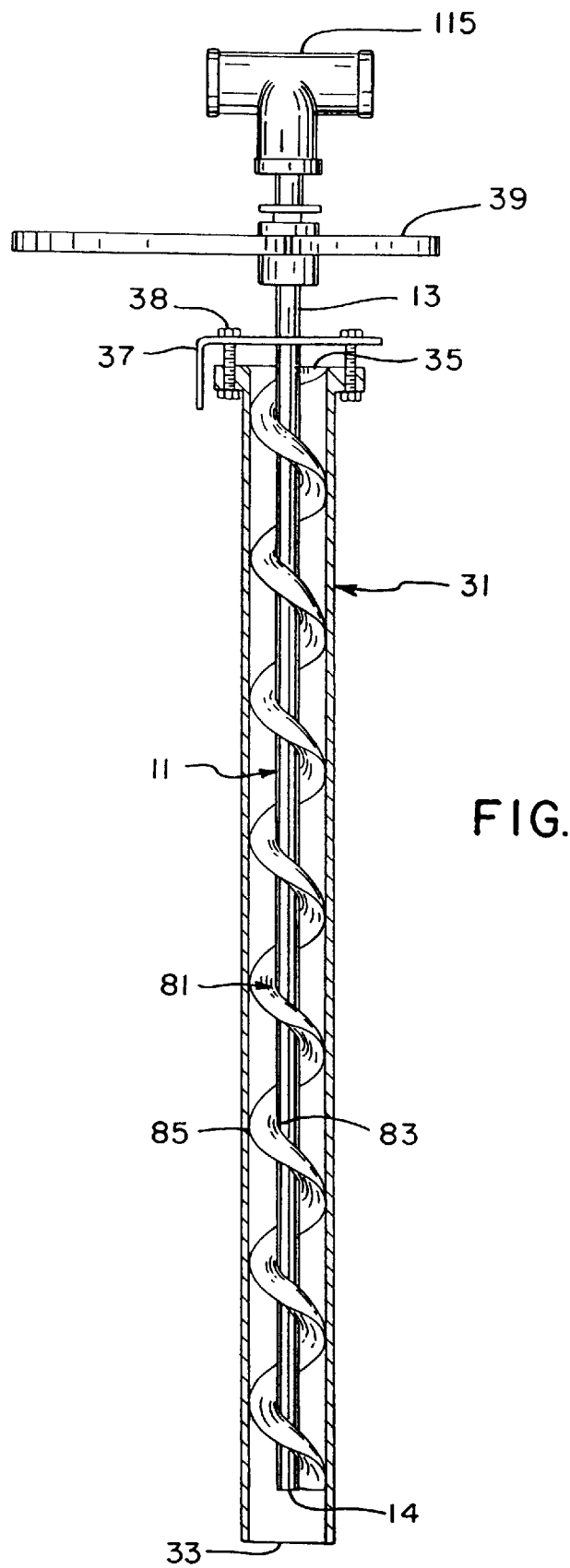
FIG. 5 is a vertical cross-sectional view of a bi-directional flow helical gravity coalescing device of the invention.

An embodiment of this aspect of the invention will now be described in greater detail, with reference to the Figures. In this aspect of the invention, any of the separators previously described above which comprises a shroud 31 further comprises a coalescer, as shown in FIGS. 3 and 5. The coalescer enhances coalescence of the lighter fluid during flow of the mixture through the shroud 31.

Coalescers are well known in the art, and come in a wide variety of configurations. Most coalescers employ tightly packed beds of coalescing media. Typical examples include metal and ceramic beads of various sizes and configurations. Coalescers function by enhancing the coalescence of oil droplets, thus improving both the speed and the efficiency of separation. Coalescers are believed to operate by increasing the total path length that the mixture must travel during separation, and by decreasing the distance that droplets of lighter fluid must travel before they collide with other droplets of lighter fluid, and thus coalesce, and by collecting and then directing the coalescing droplets to the location where the separated lighter fluid is collected. In a packed plate type of coalescer, a series of flat or corrugated plates is provided through which the mixture flows; the plates may be set parallel to or horizontal to or at any angle between relative to the direction of flow of the mixture. The distance between each plate is small, thus affording a short upward path through which droplets of the lighter fluid can travel before they "bump up" against the lower surface of the plate above. The plates are often configured to provide grooves or channels which direct the flow of these droplets upward, thus enhancing coalescence of the droplets of the lighter fluid.

Any coalescer, such as those described generally above, may be used within the shroud 31. Examples of coalescers include beads or packed plate coalescers, as previously described. The coalescers may be removably placed inside the shroud 31 as a loose aggregate, or they may be attached to the interior of the shroud 31. When an inlet pipe 11 is present within a shroud 31, the coalescers may be attached to the exterior of the inlet pipe 11. The attachment may be permanent or removable. Alternatively, the coalescer may be able to move freely between the inlet pipe 11 and the shroud 31. In one embodiment in which an inlet pipe is present within a shroud 31, the inlet pipe 11, the shroud 31, and the coalescer remain in a fixed relation to each other during use. In another embodiment, the coalescer is able to move, either with respect to the shroud 31(as when the coalescer is attached to the inlet pipe 11), the inlet pipe 11 (as when the coalescer is attached to the shroud 31), or both. A coalescer which is not in a fixed relation to either the shroud 31 or inlet pipe 11 may be attached, removably or permanently, to a means for moving or rotating the coalescer.

Preferably, the coalescer is a helical spiraled vane 81, and the inlet pipe and shroud are cylindrical, as shown in FIGS. 3 and 5. Preferably, the coalescer is permanently fixed to the exterior of the inlet pipe 11, and of such dimensions as to fit tightly against the interior of the shroud 31, so that the fluid mixture cannot flow between the outer edge of the helical spiraled vane 81, but must instead travel through the path created by the helical spiraled vane 81. Thus, the helical spiraled vane 81 has an inner edge 83 and an outer edge 85 disposed between the inlet pipe 11 and the shroud 31 such that the inner edge 83 of the vane 81 is in close contact with an exterior surface of the inlet pipe 11, and the outer edge 85 of the vane 81 is in close contact with an inner surface of the shroud 31. These close contacts, such that the mixture cannot substantially pass between the outer edge 85 of the vane 81 and the inner surface of the shroud 31 or between the inner edge 83 of the vane 81 and the exterior surface of the inlet pipe 31, thus form a helical fluid flow path within the shroud 31. The helical spiraled vane 81 extends from just below the open upper end 35 of the shroud 31 to just above the open lower end 13 of the inlet pipe 11.

Figure 4:
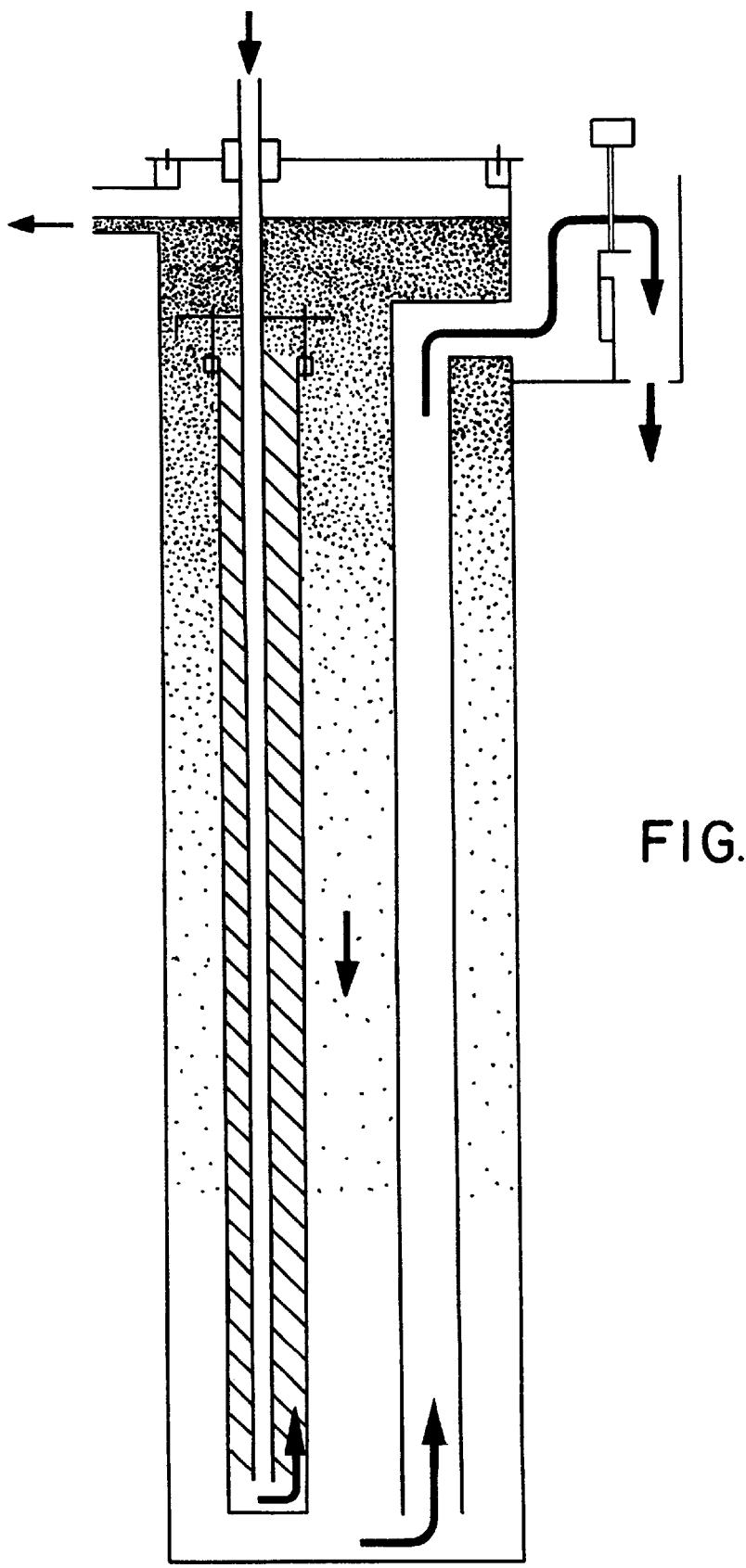
FIG. 4 is a schematic vertical cross-sectional view of a multi-directional flow gravity separator according to the invention in operation.

Separation of the two immiscible fluids during operation of this embodiment is shown schematically in FIG. 4. In this figure, the concentration of lighter fluid within tank 1 is demonstrated by stippling; the heavier the stippling, the greater the concentration of the lighter fluid. The greatest concentration of the lighter fluid is observed in the upper portion 9 of the tank 1, and at the upper surface of the collected lighter fluid. The concentration of lighter fluid within the mixture is not shown in the inlet pipe 11 or in the shroud 31. The location of the interface between the heavier and lighter fluid is not shown. The direction of fluid flow is indicated by arrows. The reference numbers are not indicated; the schematic is identical to FIG. 3.

In operation, the separator is connected to means for introducing a mixture of two immiscible fluids of different densities into the open upper end 13 of the inlet pipe 11, as previously described. The mixture flows into the upper end 13 of the inlet pipe 11 and out the open lower end 15 into the closed bottom end 33 of the shroud 31. The mixture then flows through the helical coalescer in the shroud 31. The result is an observed high degree of separation of the lighter fluid from the heavier fluid during the flow of the mixture through the coalescer. This is thought to be due to a number of factors; however, the invention is not constrained by postulated explanations of the underlying mechanisms. These factors are described to provide guidance in designing and optimizing separators of the present invention.

One factor is thought to be a change in flow rate and direction. Because the inlet pipe 11 has a smaller cross sectional inner area does the shroud 31, the flow rate of the mixture decreases at the discharge of the inlet pipe 11 into the larger shroud 31. Furthermore, the direction of the fluid path changes, in this embodiment from downward in the inlet pipe 11 to upward in the shroud 31. This change in direction and decrease in flow rate is believed to result in the droplets of the lighter fluid coalescing into larger droplet sizes. Another factor is believed to be increased flow path length for the mixture. As the mixture flows up the shroud 31, the coalescing droplets of lighter fluid rise faster and coalesce further while constrained within this upward flow passage. The greatly increased path length through the helical path formed by the spiraled helical vane 81 is believed to result in an increased coalescence of the lighter fluid, as coalescence is believed to increase as the flow path of the mixture increases.

Another factor is thought to be a short upward travel path for coalescing lighter fluid droplets, and rapid channeling of the coalesced lighter fluid droplets to the open top end 35 of the shroud 31. Thus, additional coalescence is believed to occur as the lighter fluids, which are rising more quickly than the heavier fluids within the flow path through the coalescer, are interrupted in their upward path by the helical spiraled vane 81. Droplets of lighter fluid are believed to collect on the lower surfaces of the helical spiraled vane 81, where they aggregate and further coalesce with additional smaller droplets of the lighter fluid. These coalesced droplets are then thought to be more quickly directed up and out the open top end 35 of the shroud 31 by virtue of remaining near the inner circumference of the helical path. Thus, the presence of the coalescer improves the coalescence of the lighter fluid during upward flow of the mixture through the shroud 31, resulting in increased clarification of the heavier fluid, and improved separation of the two fluids at this step. At the open top end 35 of the shroud 31, the clarified heavier fluid spills out into the tank, and begins flowing in a downward direction toward the bottom end 3 of the tank 1, whereas the coalesced droplets of lighter fluid remain near the surface of the tank.

A further coalescing step occurs at this point in the fluid flow path, thought to be due to the change in flow rate and direction; this change is the downward flow of the clarified heavier fluid, and a decrease in fluid flow rate of this fluid which is created by discharging the fluid mixture from the smaller cross sectional inner area of the shroud 31 into the larger cross sectional inner area of the tank 1 which receives the flow from the open upper end 35 of the shroud 31. This decrease in flow rate occurring near the upper portion 9 of the tank 1 results in further coalescence of droplets of lighter fluid, resulting in further clarification of the heavier fluid as it flows in a downward path toward the lower portion 9 of the tank 1. That is, some proportion of lighter fluid remains entrapped within the heavier fluid as it flows down toward the lower portion 9 of the tank 1. The residual droplets of lighter fluid continue to coalesce during this downward flow of the heavier fluid; the coalescing droplets flow back up toward the upper portion 7 of the tank 1. As the coalescing droplets flow against the flow of the heavier fluid, they pick up additional droplets of lighter fluid, thus setting up a counter-current separation of the lighter from the heavier fluid. The heavier fluid collects at the bottom of the tank 1, where it may be collected and discharged; furthermore, the heavier fluid at the bottom of the tank 1 is highly purified.

Thus, in this embodiment, there is further improved separation of the lighter from the heavier fluid, first by virtue of the upward flow through the coalescer in the shroud 31, and then by the additional counter-current separation in the subsequent downward flow in the tank 1.

Unexpectedly, a separator according to the invention offers several advantages over separators known to date. One unexpected advantage is that the design results in the capture of highly purified lighter fluid; for example, when the mixture to be separated is an oil-water mixture, the oil is so highly purified that it is considered dry and thus it can be used further without the necessity of removing any residual water. By "dry" it is meant that the water content is very low; typically, the amount of water present in oil is less than or equal to about 5%, and most preferably, the amount of water is less than about 1%.

Another unexpected advantage is that the effluent is highly purified, with very little residual lighter fluid present. For example, when the mixture is an oil-water mixture, separators known to date typically discharge an effluent which contains about 20% of the oil initially present in the mixture, which means that only about 80% of the oil initially present is removed from the mixture. In contrast, a separator according to the invention is capable of removing at least about 90% of the oil initially present in the mixture, and more preferably about 95% of the oil initially present, and most preferably about 100% of the oil initially present.

Another unexpected advantage is that as the amount of lighter fluid present in the mixture varies, from about all of the initial mixture to almost none of the initial mixture, a separator according to the invention is generally able to consistently capture about all of the lighter fluid present initially in the mixture. Thus, as the proportion of lighter fluid in the mixture increases, the amount of lighter fluid captured also increases. The result is that a separator of the invention can handle an incoming mixture of varying proportions of lighter fluid, and consistently discharge both lighter and heavier of high purity.

Another unexpected advantage is that as the flow rate of the mixture into the separator varies within the range of permissible operating parameters for any particular separator embodiment, a separator of the invention is able to consistently capture about all of the lighter fluid present in the mixture, and to discharge highly purified lighter and heavier fluids. The range of permissible operating parameters for any particular embodiment is easily determined by routine optimization.

Thus, as either the proportion of lighter fluid varies in the incoming mixture, or as the flow rate of the incoming mixture varies, a separator according to present invention is able to self-correct, and consistently capture about all of the lighter fluid initially present in the incoming mixture, and to consistently discharge the separated fluids at very high purity.

Figure 7:
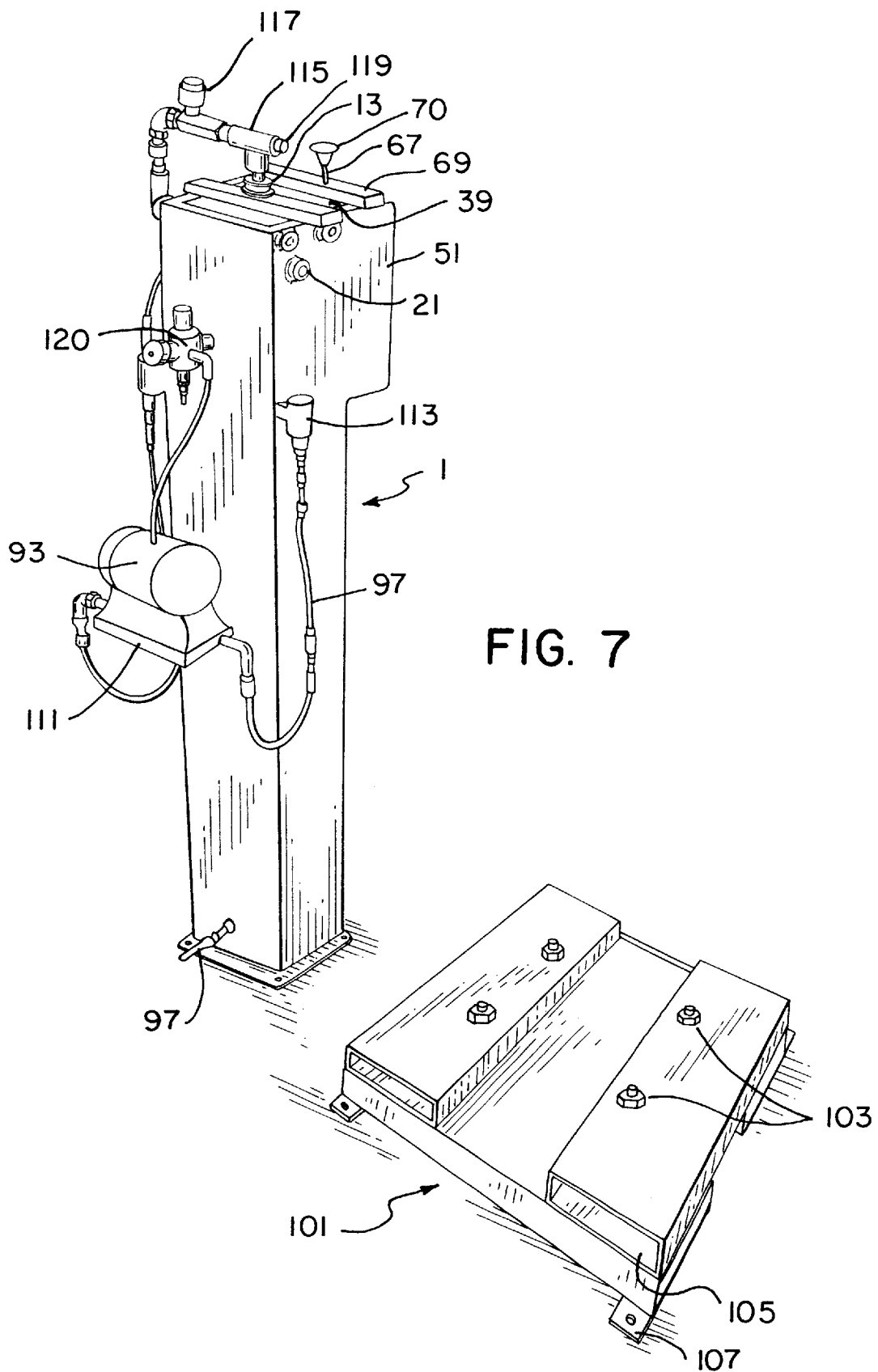
FIG. 7 is a perspective view of a particularly preferred embodiment of a multi-directional flow gravity separator according to the invention.

In another aspect of the invention, the components comprising a shroud, an inlet means which is preferably an inlet and a coalescer together comprise a bi-directional flow gravity coalescing device, which may be used independently as a separator, or which may be included as a coalescing device in other types of separators, as shown, for example, in FIG. 7. This coalescing device can also be deployed vertically, horizontally or at any angle in between.

An embodiment of this aspect of the invention will now be described in greater detail, with reference to the Figures. The bi-directional flow gravity coalescing device comprises a shroud 31 which is an elongated vessel, preferably tubular in shape. The shroud 31 has a closed lower end 33, and an open upper end 35. The separator further comprises means for introducing a fluid mixture into the shroud 31 at or near the closed bottom end 33, as previously described. Such means preferably comprise an inlet pipe 11 set within the shroud 31, as previously described, where the open upper end 13 of the inlet pipe 11 is above the open top end 3 of the shroud 31, and the open lower end 15 of the inlet pipe 11 is set slightly above the closed bottom end 33 of the shroud 31. The inlet pipe 11 may be any configuration, but is preferably round; the cross-sectional inner area of the inlet pipe 11 is also less than that of the shroud 31.

Any coalescer, such as those previously described, may be used within the shroud 31. Examples of coalescers include metal and ceramic beads of various sizes and configurations, and packed plates comprising flat or corrugated or grooved, closely spaced plates of any appropriate material placed at any angle from substantially perpendicular to substantially parallel to the direction of the fluid flow. The coalescers may be removably placed inside the shroud 31 as a loose aggregate, or they may be attached to the interior of the shroud 31. When an inlet pipe 11 is present within a shroud 31, the coalescers may be attached to the exterior of the inlet pipe 11. The attachment may be permanent or removable. Alternatively, the coalescer may be able to move freely between the inlet pipe 11 and the shroud 31. In one embodiment in which an inlet pipe is present within a shroud 31, the inlet pipe 11, the shroud 31, and the coalescer remain in a fixed relation to each other during use. In another embodiment, the coalescer is able to move, either with respect to the shroud 31 (as when the coalescer is attached to the inlet pipe 11), the inlet pipe 11 (as when the coalescer is attached to the shroud 31), or both. A coalescer which is not in a fixed relation to either the shroud 31 or inlet pipe 11 may be attached, removably or permanently, to a means for moving or rotating the coalescer.

Preferably, the coalescer is a helical spiraled vane 81, and the inlet pipe and shroud are both cylindrical, as shown in FIGS. 3 and 5. Preferably, the coalescer is permanently fixed to the exterior of the inlet pipe 11, and of such dimensions as to fit tightly against the interior of the shroud 31, so that the fluid mixture cannot flow between the outer edge of the helical spiraled vane 81, but must instead travel through the path created by the helical spiraled vane 81. Thus, the helical spiraled vane 81 has an inner edge 83 and an outer edge 85 disposed between the inlet pipe 11 and the shroud 31 such that the inner edge 83 of the vane 81 is in close contact with an exterior surface of the inlet pipe 11, and the outer edge 85 of the vane 81 is in close contact with an inner surface of the shroud 31. These close contacts, such that the mixture cannot substantially pass between the outer edge 85 of the vane 81 and the inner surface of the shroud 31 or between the inner edge 83 of the vane 81 and the exterior surface of the inlet pipe 31, thus form a helical fluid flow path within the shroud 31. The helical spiraled vane 81 extends from just below the open upper end 35 of the shroud 31 to just above the open lower end 13 of the inlet pipe 11.

The bi-directional flow gravity coalescing device may be used in a separator such as is described for the present invention, or it may be used alone. It may be used in a vertical position, a horizontal position, or at any angle between horizontal or vertical. In use, the coalescer within the vertical coalescing device may be stationary, or it may rotate. If it rotates, it may rotate separately from the inlet pipe 11, separately from the shroud 31, or separately from both.

In operation of this embodiment, where the inlet means into the shroud 31 comprises an inlet pipe 11, the coalescing device is connected to means for introducing a mixture of two immiscible fluids of different densities into the open upper end 13 of the inlet pipe 11. Such means include tubing or piping connected to the upper end 13 from a pump, whereby the mixture is pumped into the upper end 13 of the inlet pipe 1. Such means also include tubing or piping from another source, where the mixture flows into upper end 13 of the inlet pipe 1 by gravity flow. The mixture flows down inlet pipe 11 and out the open lower end 15 into the closed lower end of the shroud 31. It then flows up the shroud 31 through the coalescer; as it flows up, the lighter fluid rises faster, and begins to coalesce as it rises. When the coalescer is a helical spiraled vane 81, as shown in FIG. 5, the coalescing device is referred to as a bi-directional flow helical gravity coalescing device. The presence of the coalescer improves the coalescence of the lighter fluid, resulting in increased clarification of the heavier fluid, and improved separation of the two fluids as the mixture flows through the device, as described previously. As it exits the shroud 31, the lighter fluid may be separately collected at this point. The heavier fluid rises more slowly; when it reaches the open upper end 35 of the shroud 31, it may be separately collected. The coalescer may remain in fixed relation with the inlet pipe 11 and the shroud 31, or it may rotate with respect to either the inlet pipe 11, the shroud 31, or both. When it rotates during use, the coalescer is connected to means for rotating it. Such means include a motor or similar means to impart rotation.

Separators and coalescing devices of the present invention as described herein may be constructed of any number of industrially available materials, including plastics, fibreglass, aluminum, mild steel and stainless steel. Not all components of any particular separator must be made of the same material; each component may be fabricated from any of these materials, and used together. Preferably, the separators are constructed of materials suitable to meet temperature and corrosion requirements of the installation. For example, when a separator is used to clean washing solutions which are used to wash machine parts or heat treated parts, and the washing solution is contaminated with manufacturing oils and heat treating quench oil, the separator is preferably fabricated of stainless steel.

Another aspect of the present invention is a system for separating a mixture of two immiscible fluids of different densities, which comprises a multi-directional flow gravity separator of any of the embodiments described previously and means for collecting the mixture from a source fluid and delivering it to the separator. Typically, the source fluid comprises a first fluid contaminated by the presence of a second fluid, where the second contaminating fluid is present in a lower proportion than is the first fluid. Preferably, the means for collecting the mixture results in an enhancement in the presence of one of the two fluids, typically the lighter fluid, and especially when the lighter fluid is a contaminating fluid present in much lower proportions than a heavier fluid. By "enhancement" it is meant that the proportion of one fluid in the collected mixture is greater than its proportion in the uncollected source fluid. For example, for a source of an oil-contaminated water, the proportion of oil in the collected mixture would be greater relative to its proportion in the oil-water source. Preferably, the means for collecting the mixture is a skimmer, which collects a fluid mixture near the surface of a large volume of the source fluid; preferably, such a skimmer is a floating skimmer, more preferably such a skimmer is a suction skimmer, and most preferably, such a skimmer can be adjusted to collect a surface mixture to varying depths to result in a fluid mixture of enhanced proportions of light fluid.

Figure 6:
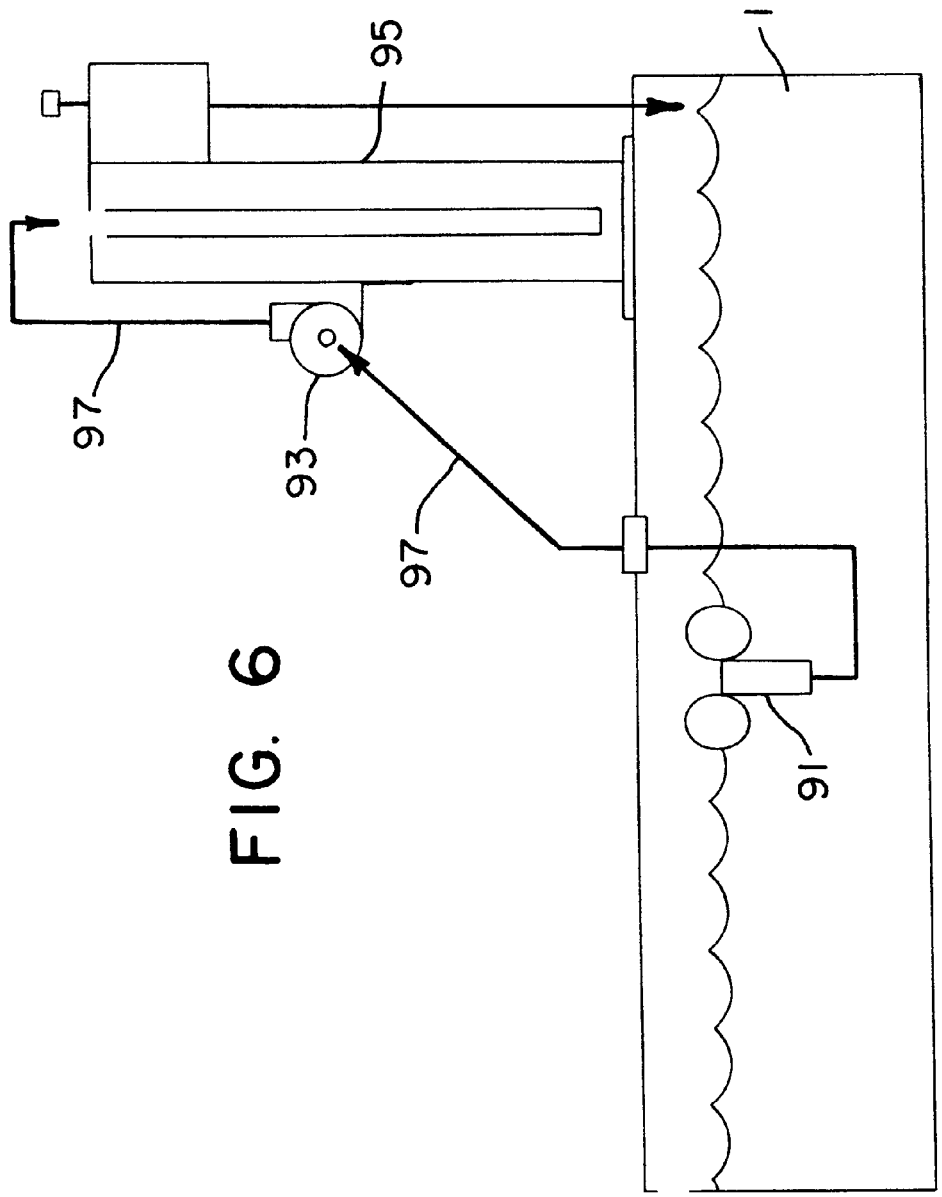
FIG. 6 is a schematic of a separating system of the invention.

An embodiment of this aspect of the invention will now be described in greater detail, with reference to the Figures. In this aspect of the invention, as shown in FIG. 6, the system comprises a separator 95 according to the present invention, a means 91 for collecting source fluid 90 and a means 93 for delivering the collected source fluid to the separator.

Typically, the source fluid 90 comprises a first fluid contaminated by the presence of a second fluid, where the second contaminating fluid is present in a lower proportion than is the first fluid in the source fluid 90. Such a situation exists, for example, in oil-contaminated water. Such contamination occurs in large bodies of water, as for example in oil leaks in the ocean or industrial pollution of inland lakes and rivers. Such contamination also occurs in industrial processes, as from washing machined or heat treated parts in wash water contained within large tanks.

Preferably, the means for collecting the mixture results in an enhancement in the presence of one of the two fluids, typically the lighter fluid, and especially when the lighter fluid is a contaminating fluid present in much lower proportions than a heavier fluid. For example, for a source of an oil contaminated water, the proportion of oil in the collected mixture would be greater relative to its proportion in the oil-water source. There are many different types of collecting devices 91 which would be suitable for use in this system. Examples include drag-out systems, which include oil belts, discs, drums and mops. These devices have a component that rotates in and out of the fluid source 90. As these components rotate out of the source fluid 90, materials clinging to them are scraped off into a waste collection vessel, such as a barrel. From the barrel, the mixture can be delivered to a separator 95 of the present invention.

Preferably, the means for collecting the mixture 91 is a skimmer, which collects a fluid mixture near the surface of a large volume of the source fluid 90; preferably, such a skimmer is a floating skimmer, more preferably such a skimmer is a suction skimmer, and most preferably, such a skimmer can be adjusted to collect a surface mixture to varying depths to result in a fluid mixture of enhanced proportions of lighter fluid. A skimmer of the preferred embodiment is described in U.S. Pat. application Ser. No.09/226,331, which is hereby incorporated in its entirety.

The collecting device 91 is connected to a pump 93 which is then connected to a separator 95 of the present invention. In another embodiment, the collecting device 91 can send the mixture to the separator 95 by gravity flow. The connection to the separator 95 occurs at the inlet means of the separator, such that the mixture is delivered to the inlet means of the separator 95. The means connecting 97 the collecting device 91 to the pump 93 and the pump 93 to the separator 95 include piping and tubing. Piping is generally inflexible pipe, comprising either a plastic or metal material. Tubing is generally flexible tubing, comprising a pliable appropriate material, and is the preferred connecting means 97. The material of the connecting means 97 must be relatively inert with respect to the mixture which flows through it, and sufficiently strong to withstand use in the system for long periods of time. The choice of any particular material is well known in the art, and is selected to withstand the temperatures, fluid pH and solvent characteristics, and pressures which would be encountered in any particular installation.

The pump 93 may be located anywhere between the collecting device 91 and the separator 95; preferably, it is mounted to the outside of the separator 95. Mounting means 99 may be attached either permanently or removably to the outer wall of the separator 95; such means include shelving and brackets, which may be attached, for example, by welding or by bolts or clamps. The pump 93 may be of any type, such as centrifugal or positive displacement pump; preferably, the pump is a positive displacement pump. The pump 93 may also serve both to power the collection of the mixture by means of the collection device 91 on the suction side of the pump 93 and to deliver the mixture to the vertical separator 95 via the discharge side of the pump 93, and is preferably a suction pump.

In operation, the collecting device 91 with the pump 93 collects a mixture of fluid from near the surface of the source fluid 90, preferably such that the presence of one fluid, preferably the lighter fluid, is enhanced. This mixture is then pumped from the collecting device 91 to the separator 95, and delivered to the inlet means of the separator 95. The mixture is then separated by the separator 95 as described previously.

When used to separate oil from oil-contaminated water, the vertical separator 95 may be mounted such that the clarified water can be returned to the original source fluid by gravity flow or by pumping, as shown in FIG. 6. In this embodiment, the collecting device 91 is a floating skimmer which floats on the surface of the oil-contaminated water in the tank, and collects a mixture of fluid from the surface of the fluid. The separator 95 is mounted next to or over the source of the oil-contaminated water, such that the clarified water can drain directly back into the oil-contaminated water, or drain by hosing or other connecting means back into the oil-contaminated water. The oil is typically collected in a separate vessel (not shown) and removed. This system thus continuously removes oil from the oil-contaminated water.

A particularly preferred embodiment of a separator of the present invention is shown in FIG. 7 and FIG. 5. This embodiment is typically used for the separation of oil from oil-contaminated water.

In this embodiment, the tank 1 is rectangular in cross-section, and comprises within it a bi-directional flow helical gravity coalescing device essentially as shown in FIG. 5. The open upper end 13 of the inlet tube 11 is screwed into a bracket 39 which is attached to the tank by bolts 40. A splash guard 37 is welded to the inlet pipe 11, and the shroud 31 is attached to the splash guard by means of bolts 38. The helical spiraled vane 81 is welded to the exterior surface of the inlet pipe 11. In this embodiment, the coalescing device 40 may be removed as a unit from the tank, by unbolting the bracket 39 from the tank 1, and lifting the coalescing device 40 out of the tank 1. The shroud 31 may be removed from the coalescing device 40 by unbolting the shroud 31 from splash guard 37. The inlet pipe 11 may also be removed from bracket 39, by unscrewing inlet pipe 11 from bracket 39. This ease of disassembly and assembly facilitates inspection and routine maintenance, including cleaning and repair, when necessary.

As shown schematically in FIG. 3, the effluent discharge tube 41 is welded inside the tank next to the wall on which the weir housing 51 is located. It is connected to the upper effluent discharge port 25 by a cross tube 47, where the upper effluent discharge port 25 is connected to the weir housing 51. The tank 1 is further configured to contain an integral weir housing 51. The weir housing 51 contains an adjustable weir 61, where the adjustable weir 61 is controlled by bolt 67 which is mechanically attached to bracket 39.

The weir effluent discharge port 55 is an outlet in the bottom of the weir housing 51 downstream from the adjustable weir 61; the clarified water is thus discharged passively from the separator weir effluent discharge port 55. The oil is removed from the separator passively through the lighter fluid discharge port 21 in the upper portion 7 of the tank 1, which in this embodiment is a captured oil discharge port. The tank 1 also contains an lower effluent discharge port 23 in the lower portion 9 of the tank 1, which in this embodiment is a maintenance drain. This maintenance drain 23 may be used to discharge fluid from the closed bottom end 5 or from the lower portion 9 of the tank 1, for example during scheduled maintenance procedures.

The tank 1 also contains means 111 for mounting a pump 93 on the external wall opposite the side on which the weir housing 51 is located. However, the location of the pump 93 is not critical, and the means 111 for mounting it are well known in the art, and examples have been previously described.

Piping interconnect points 111 are used on the sidewalls not used by the weir housing 51 and the transfer pump 93 to facilitate piping connections to the vertical separator, as required by site conditions. This embodiment also includes a T-connection to the inlet pip 11. One arm of the T connection is connected to the pump 93; a fluid control valve 117 is shown between the pump and the inlet pipe 11. The other arm of the T may be used as drain 119 for the shroud 31; for example, it may connected to a pump (not shown) to remove fluid within the shroud 31 during maintenance. The embodiment also includes an air filter regulator 120 for use with a suction air pump 93.

The separator may be mounted on a base 101 as shown. In this preferred embodiment, the separator is bolted to the base at four locations 103. Furthermore, the base is shaped to contain means by which the base may be lifted and moved, where such means comprise open structural members 105. These open structural members 105 are present on each side of the base 101, such that the separator bolted to the base 101 may be moved by a fork lift or similar equipment from any side. Finally, the base 101 itself may be bolted to another surface at four locations 107. These same four locations 107 may be used to mount the separator in any convenient location remote from the tank containing oil-contaminated water.

Another aspect of the invention is a method for continuously separating two immiscible fluids of different densities, by different flow directions and rates and by gravity.

In one embodiment, the invention provides a method for continuously separating a mixture of two immiscible fluids having different densities including a lighter fluid and a heavier fluid, comprising adding the mixture to a generally vertical elongated tank, where the tank is preferentially filled with heavier fluid, and causing the mixture to flow in a generally downward direction at a rate which is sufficiently slow to allow the lighter fluid to coalesce during the downward flow and to rise to the upper fluid surface in the tank, where it collects. The clarified heavier fluid collected in the lower portion of the tank is directed to flow in an upward direction in such a fashion that the upward flow of the heavier fluid is isolated from the downward flow of the mixture. The collected lighter fluid may be discharged continuously, or in batches; the heavier fluid is discharged continuously.

When discharged continuously, the collected lighter fluid is discharged from the upper surface of the lighter fluid, which is at a certain distance above the bottom of the tank, and the heavier fluid is discharged after flowing upward to a point at a second distance above the bottom of the tank; the rates of discharge of the two fluids are about equal the rate of inflow of the mixture, to maintain about an approximately constant volume of fluid in the tank. The height of the discharge points of the two separated fluids are only slightly different, such that the discharge point of the heavier fluid is slightly lower than the discharge point of the lighter fluid. This allows the amount of lighter fluid to collect above the interface between the two fluids, where it forms a mat. As additional amounts of lighter fluid are collected inside the separator, the mat of lighter fluid increases in volume, and, as it is constrained by the cross-sectional inner area of the tank, the height of the mat above the interface increases. The weight of the collected lighter fluid then displaces the heavier fluid to a level which is lower than the level that the heavier fluid alone would have in the tank. At the same time, due to its lower density, the upper surface of the lighter fluid is slightly higher than the level that the heavier fluid alone would have in the tank. Eventually the upper surface of the mat reaches the discharge point for the lighter fluid, after which it is then continuously discharged. The net result is that the level of fluid within the tank, and thus the level of the upper surface of the lighter fluid, are maintained at a certain level, resulting in the discharge of high purity lighter fluid.

When discharged in batches, the discharge point for the heavier fluid is set such that lighter fluid collects to a certain depth; when the desired amount of lighter fluid is reached, it is then collected from the upper surface of the lighter fluid down to any desired relative level in a batch, as for example by opening a discharge port set below its upper surface, or by collecting it in a discharge tube, or by raising the level of the heavier fluid so that the desired amount of lighter fluid is discharged through the discharge means in one batch.

In another embodiment, the invention provides a method for continuously separating a mixture of two immiscible fluids having different densities including a lighter fluid and a heavier fluid, comprising adding the mixture to a generally vertical elongated tank, where the tank is preferentially filled with heavier fluid, and directing the mixture to flow in a generally upward direction such that the upward flow of the mixture is isolated from the fluid in the tank, and at a certain flow rate such that the lighter fluid coalesces during the upward flow and rises to the upper surface of fluid in the tank. The resulting mixture is then redirected to flow in a generally downward direction such that the downward flow of the mixture is isolated from the upward flow of the mixture, and further such that the downward flow rate of the mixture is slower than the initial upward flow rate and is sufficiently slow to allow the lighter fluid to coalesce during the downward flow and to rise to the upper fluid surface in the tank, where it collects. The collected lighter fluid is discharged from the upper surface of the lighter fluid, which is at a certain distance above the bottom of the tank, and the clarified heavier fluid collected in the bottom of the tank is discharged from the bottom of the tank; the lighter fluid may be discharged continuously or in a batch.

When the lighter fluid is discharged continuously, the rates of discharge of the two fluids equal the rate of inflow of the mixture, to maintain about a constant volume of fluid in the tank, and to maintain about a constant fluid level within the tank. Thus, the amount of lighter fluid which collects before it is discharged, and the height at which the lighter fluid is discharged, are both controlled, so as to allow discharge of the only the upper portion of, and thus of the most highly purified, lighter fluid.

When the lighter fluid is discharged in a batch, the rate of discharge of the clarified effluent is slightly less than the rate of inflow of the mixture, to allow collection of the lighter fluid to a desired amount. The lighter fluid may then be discharged in a batch, as described above.

In another embodiment, the invention provides a method for continuously separating a mixture of two immiscible fluids having different densities including a lighter fluid and a heavier fluid, where the method combines elements of the preceding embodiments. Thus, the method comprises adding the mixture to a generally vertical elongated tank, where the tank is preferentially filled with heavier fluid, directing the mixture to flow in a generally upward direction such that the upward flow of the mixture is isolated from the fluid in the tank, and at a certain flow rate such that the lighter fluid coalesces during the upward flow and rises to the upper surface of fluid in the tank. The resulting mixture is then redirected to flow in a generally downward direction such that the downward flow of the mixture is isolated from the upward flow of the mixture, and further such that the downward flow rate of the mixture is slower than the initial upward flow rate and is sufficiently slow to allow the lighter fluid to coalesce during the downward flow and rise to the upper fluid surface in the tank, where it collects. The clarified heavier fluid collected in the lower portion of the tank is directed to flow in an upward direction in such a fashion that the upward flow of the heavier fluid is isolated from the downward flow of the mixture, and from the initial upward flow of the mixture. The collected lighter fluid is discharged from the upper surface of the lighter fluid, which is at a certain distance above the bottom of the tank, and the heavier fluid is discharged after flowing upward to a second distance above the bottom of the tank; the rates of discharge of the two fluids equal the rate of inflow of the mixture, to maintain about a constant volume of fluid in the tank. The collected lighter fluid may be discharged continuously, or in a batch, and the heavier fluid is discharged continuously, as previously described.

When discharged continuously, the collected lighter fluid is discharged from the upper surface of the lighter fluid, which is at a certain distance above the bottom of the tank, and the heavier fluid is discharged after flowing upward to a second distance above the bottom of the tank; the rates of discharge of the two fluids is about equal to the rate of inflow of the mixture, to maintain about an approximately constant volume of fluid in the tank. The height of the discharge points of the two separated fluids are only slightly different, such that the discharge point of the heavier fluid is slightly lower than the discharge point of the lighter fluid, as described previously. The result is that the level of fluid within the tank, and thus the level of the upper surface of the lighter fluid, are maintained at a certain level, resulting in the discharge of high purity lighter fluid.

When discharged in a batch, the discharge point for the heavier fluid is set such that lighter fluid collects to a certain depth; when the desired amount of lighter fluid is reached, it is then collected from the upper surface of the lighter fluid down to any desired relative level in a batch, as for example by opening a discharge port set below its upper surface, or by collecting it in a discharge tube, or by raising the level of the heavier fluid such that the desired amount of lighter fluid may be discharged.

In another embodiment, the invention provides a method for separating a mixture of two immiscible fluids having different densities including a lighter fluid and a heavier fluid, comprising any of the embodiments previously described in which the mixture is directed to flow in a generally upward direction, where the upward flow of the mixture further comprises flowing through a coalescer. Coalescers are well known in the art, and have been previously described; any coalescer which enhances coalescence of the lighter fluid is suitable. Preferably, the coalescer results in a fluid path length which is substantially greater than the fluid path length of the upwardly flowing mixture in the absence of the coalescer. Most preferably, the coalescer results in an upward flow of the mixture through a helical path.

In another aspect of the invention, the invention provides a method for separating a mixture of two immiscible fluids having different densities including a lighter fluid and a heavier fluid, comprising adding the mixture to an elongated vessel, directing the mixture to flow for some distance at an initial rate in a direction which is preferably generally downward, and redirecting the mixture to flow in a different direction which is preferably generally upward and at a second flow rate which is less than the initial flow rate and for a second distance, such that the upward flow of the mixture is isolated from the first preferably downward flow of the mixture, and further such that the upward flow of the mixture occurs through a coalescer. Coalescers are well known in the art, and have been previously described; any coalescer which enhances coalescence of the lighter fluid is suitable. Preferably, the coalescer results in a fluid path length which is substantially greater than the fluid path length of the preferably upwardly flowing mixture in the absence of the coalescer. Most preferably, the coalescer results in a preferably upward flow of the mixture through a helical path.

While particular examples of the present invention have been shown and described, it is apparent that changes and modifications may be made therein without departing from the invention in its broadest aspects. The size, configuration, and arrangement of components can be changed to meet specific requirements. For example vertical separators of circular cross-section could be constructed to meet certain material or site requirements. Accessories such as fluid strainers may be included to increase the effectiveness of a separator at capturing non-floating solids and grit from the source fluid. With removal of solids as a goal, the inlet device for the separator could be modified to collect and remove settled solids from the lower portion of the wash tank. The aim of the appended claims, therefore, is to cover all such changes and modifications as fall within the true spirit and scope of the invention.

The embodiments of the invention in which an exclusive property or privilege is claimed are defined as follows:

1. A multi-directional flow gravity separator for separating a mixture of two immiscible fluids having different densities including a heavier fluid and a lighter fluid, comprising:
   a vertical elongated tank with a first cross-sectional area, an upper portion, a lower portion, and an open top end,
   an elongated vertical shroud set within and in fluid communication with the tank, wherein the shroud has a second cross-sectional inner area which is less than the first cross-sectional inner area of the tank, an open top end, and a closed bottom end, where the open top end is in fluid communication with the tank and below the open top end of the tank and within the upper portion of the tank,
   an inlet pipe for introducing the mixture into the shroud, wherein the pipe has a third cross-sectional inner area which is less than the second cross-sectional inner area of the shroud, an open first end outside the tank, and a second end in fluid communication with the closed bottom end of the shroud, and further wherein the inlet pipe is a vertical pipe within the shroud, such that the open first end is an open upper end above the open top end of the tank and the second end is an open lower end near the closed bottom end of the shroud,
   means for discharging the heavier fluid from the lower portion of the tank, and
   means for discharging the lighter fluid from the upper portion of the tank,
   wherein the shroud and the inlet pipe are cylindrical and the shroud comprises a coalescer within the shroud, wherein the coalescer comprises:
      a continuously spiraled vane extending from about the open lower end of the inlet pipe to about the open top end of the shroud and having an inner edge and an outer edge, wherein the inner edge of the vane is in close contact with an exterior surface of the inlet pipe, and the outer edge of the vane is in close contact with an inner surface of the shroud,
      such that the mixture cannot substantially pass between the outer edge of the vane and the inner surface of the shroud or between the inner edge of the vane and the exterior surface of the inlet pipe, thereby forming a helical fluid path within the shroud.

2. A multi-directional flow gravity separator for separating a mixture of two immiscible fluids having different densities including a heavier fluid and a lighter fluid, comprising:
   a vertical elongated tank with a first cross-sectional area, an upper portion, a lower portion, and an open top end,
   an elongated vertical shroud set within and in fluid communication with the tank, wherein the shroud has a second cross-sectional inner area which is less than the first cross-sectional inner area of the tank, an open top end, and a closed bottom end, where the open top end is in fluid communication with the tank and below the open top end of the tank and within the upper portion of the tank,
   an inlet pipe for introducing the mixture into the shroud, wherein the pipe has a third cross-sectional inner area which is less than the second cross-sectional inner area of the shroud, an open first end outside the tank, and a second end in fluid communication with the closed bottom end of the shroud, and further wherein the inlet pipe is a vertical pipe within the shroud, such that the open first end is an open upper end above the open top end of the tank and the second end is an open lower end near the closed bottom end of the shroud,
   means for discharging the lighter fluid from the upper portion of the tank comprising a first outlet in the upper portion of the tank, and
   means for discharging the heavier fluid from the lower portion of the tank comprising a vertical effluent discharge tube set within the tank, wherein the effluent discharge tube has a fourth cross-sectional inner area which is less than the first cross-sectional inner area of the tank, an open lower end within and in fluid communication with the lower portion of the tank, and an upper end in fluid communication with means for discharging the heavier fluid from the upper end of the effluent discharge tube to outside the tank comprising a second outlet in the upper portion of the tank, such that the second outlet is slightly lower than the first outlet,
   wherein the shroud and the inlet pipe are cylindrical and the shroud comprises a coalescer within the shroud, wherein the coalescer comprises:
      a continuously spiraled vane extending from about the open lower end of the inlet pipe to about the open top end of the shroud and having an inner edge and an outer edge, wherein the inner edge of the vane is in close contact with an exterior surface of the inlet pipe, and the outer edge of the vane is in close contact with an inner surface of the shroud,
      such that the mixture cannot substantially pass between the outer edge of the vane and the inner surface of the shroud or between the inner edge of the vane and the exterior surface of the inlet pipe, thereby forming a helical fluid path within the shroud.

3. A bi-directional flow coalescing device for separating a mixture of two immiscible fluids having different densities, comprising:
   an elongated shroud with a first cross-sectional inner area and an open top end and a closed bottom end,
   an inlet pipe in fluid communication with the shroud, wherein the pipe has a second cross-sectional inner area which is less than the first cross-sectional inner area of the shroud and an open first end outside the shroud and a second end in fluid communication with the closed bottom end of the shroud, and
   a coalescer within the shroud,
   wherein the inlet pipe is a pipe within the shroud, such that the open first end is an upper end of the pipe above the open top end of the shroud and the second end is an open lower end of the pipe near the closed bottom end of the shroud, and
   wherein the shroud and the inlet pipe are cylindrical and wherein the coalescer comprises:
      a continuously spiraled vane extending from about the open lower end of the inlet pipe to about the open top end of the shroud and having an inner edge and an outer edge, wherein the inner edge of the vane is in close contact with an exterior surface of the inlet pipe, and the outer edge of the vane is in close contact with an inner surface of the shroud,
      such that the mixture cannot substantially pass between the outer edge of the vane and the inner surface of the shroud or between the inner edge of the vane and the exterior surface of the inlet pipe, thereby forming a helical fluid path within the shroud.

* * * * *